(12) United States Patent
Hatakeyama et al.

(10) Patent No.: US 9,623,719 B2
(45) Date of Patent: Apr. 18, 2017

(54) THERMAL MANAGEMENT SYSTEM FOR ELECTRIC VEHICLE AND ITS CONTROL METHOD

(71) Applicant: CALSONIC KANSEI CORPORATION, Saitama-shi, Saitama (JP)

(72) Inventors: Jun Hatakeyama, Saitama (JP); Takayuki Ishikawa, Saitama (JP); Masashi Koshijima, Sagamihara (JP); Satoshi Ogihara, Fujisawa (JP); Hitoshi Shimonosono, Yokohama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 69 days.

(21) Appl. No.: 14/421,354

(22) PCT Filed: Jun. 18, 2013

(86) PCT No.: PCT/JP2013/066664
§ 371 (c)(1),
(2) Date: Feb. 12, 2015

(87) PCT Pub. No.: WO2014/027507
PCT Pub. Date: Feb. 20, 2014

(65) Prior Publication Data
US 2015/0217623 A1 Aug. 6, 2015

(30) Foreign Application Priority Data
Aug. 13, 2012 (JP) .................................. 2012-179334

(51) Int. Cl.
*B60H 1/00* (2006.01)
*B60L 1/00* (2006.01)
(Continued)

(52) U.S. Cl.
CPC ....... *B60H 1/00278* (2013.01); *B60H 1/2215* (2013.01); *B60H 1/3208* (2013.01);
(Continued)

(58) Field of Classification Search
CPC ............ B60H 1/00735; B60H 1/00278; B60H 1/00271; B60H 1/00328; B60H 1/00642; B60H 1/00428
(Continued)

(56) References Cited

U.S. PATENT DOCUMENTS

| 2002/0043413 A1 | 4/2002 | Kimishima et al. |
| 2011/0139397 A1 | 6/2011 | Haussmann |

(Continued)

FOREIGN PATENT DOCUMENTS

| JP | 05-270252 | 10/1993 |
| JP | 2002-191104 A | 7/2004 |

(Continued)

OTHER PUBLICATIONS

Hatakeyama: US Office Action on U.S. Appl. No. 14/421,377 dated Jul. 21, 2016.

*Primary Examiner* — Davis Hwu
(74) *Attorney, Agent, or Firm* — Foley & Lardner LLP

(57) ABSTRACT

A thermal management system for an electric vehicle that is used in the electric vehicle driven by an electric motor includes a refrigerant loop for an air conditioner, a refrigerant loop for a battery that allows a refrigerant for the battery to circulate among the battery, an evaporating unit and a heating device, and thermal management controlling means that, during charging of the battery, heats the refrigerant for the battery by using the heating device when temperature of the refrigerant for the battery is lower than target temperature of the refrigerant for the battery, and that allows the refrigerant for the air conditioner to circulate and (Continued)

to absorb heat from the refrigerant for the battery, in the evaporating unit, when the temperature of the refrigerant for the battery is higher than the target temperature of the refrigerant for the battery.

9 Claims, 17 Drawing Sheets

(51) Int. Cl.
*B60L 1/02* (2006.01)
*B60L 11/18* (2006.01)
*B60H 1/32* (2006.01)
*H01M 10/663* (2014.01)
*B60H 1/22* (2006.01)

(52) U.S. Cl.
CPC ............... *B60L 1/003* (2013.01); *B60L 1/02* (2013.01); *B60L 11/1862* (2013.01); *B60L 11/1874* (2013.01); *H01M 10/663* (2015.04); *B60H 2001/00307* (2013.01); *B60H 2001/3261* (2013.01); *B60H 2001/3263* (2013.01); *B60L 2240/36* (2013.01); *B60L 2240/545* (2013.01); *Y02T 10/7005* (2013.01); *Y02T 10/705* (2013.01); *Y02T 10/7044* (2013.01)

(58) Field of Classification Search
USPC .................................................. 165/202, 10
See application file for complete search history.

(56) References Cited

U.S. PATENT DOCUMENTS

| 2012/0312040 A1* | 12/2012 | Choi ..................... F25D 21/06 62/156 |
| 2012/0327596 A1* | 12/2012 | Anderson-Straley H01M 10/625 361/689 |
| 2014/0033761 A1* | 2/2014 | Kawakami ......... B60H 1/00278 62/498 |
| 2014/0041826 A1* | 2/2014 | Takeuchi .................. B60L 1/02 165/10 |

FOREIGN PATENT DOCUMENTS

| JP | 2006-296193 A | 10/2006 |
| JP | 2002-352867 A | 12/2006 |
| JP | 2010-272285 A | 12/2010 |
| JP | 2011-68348 A | 4/2011 |

* cited by examiner

THERMAL MANAGEMENT SYSTEM FOR ELECTRIC VEHICLE AND ITS CONTROL METHOD

TECHNICAL FIELD

The present invention relates to a thermal management system for an electric vehicle that is mounted on the electric vehicle and its control method.

BACKGROUND ART

An electric vehicle that travels by a driving force of an electric motor cannot use waste heat of an engine at the time of heating, since the engine is not mounted thereon. Further, the amount of heat at the time of heating is not enough even in an electric vehicle on which the engine is mounted, such as a hybrid vehicle, since it does not operate the engine at all times. For this reason, an air conditioning device that is formed by a refrigerant cycle having an electric compressor is used at the time of heating, so as to increase temperature inside a cabin.

However, power accumulated in a battery is consumed by the amount used for operating the air conditioning device, which results in a reduction in cruising distance of the vehicle.

JP2011-68348A discloses an air conditioning system provided with a heat exchanger that has a cooling water circuit for cooling a battery, in addition to a refrigerant cycle forming an air conditioning device, and that can exchange heat between the refrigerant and the cooling water. According to this air conditioning system, the battery is heated at the time of charging, and the heat stored in the battery is used when the vehicle is in operation and when the heating is used.

SUMMARY OF INVENTION

According to the air conditioning system of the above-described patent document, however, heat is transferred from hot gas (high-temperature refrigerant) in the refrigerant cycle to the cooling water via the heat exchanger, at the time of heating the battery. Further, the refrigerant cycle is allowed to function as a heat pump cycle at the time of heating, and heat is transferred from the cooling water to the refrigerant via the heat exchanger.

Therefore, when it is necessary to heat the battery at the time of charging, the high-temperature refrigerant in the refrigerant cycle is supplied to the heat exchanger, and when the temperature of the cooling water increases by the heat generated by the battery itself and when it is necessary to cool the cooling water, a low-temperature refrigerant in the refrigerant cycle is supplied to the heat exchanger. This results in a reduction of a following property of the refrigerant cycle, when the heating and the cooling of the battery are repeated at the time of charging the battery, which causes a difficulty in controlling the temperature of the battery within a desired temperature range.

It is an object of the present invention to provide a thermal management system for an electric vehicle that can keep the temperature of the battery to be within the desired temperature range at the time of charging, and that can store heat in the battery more efficiently.

According to an aspect of the present invention, provided is a thermal management system for an electric vehicle that is used in the electric vehicle driven by an electric motor, including a refrigerant loop for an air conditioner that includes a compressing unit for compressing a refrigerant for the air conditioner, a condensing unit for condensing the refrigerant for the air conditioner by radiating heat of the refrigerant for the air conditioner, a pressure reducing unit for expanding and reducing pressure of the refrigerant for the air conditioner, and an evaporating unit for evaporating the refrigerant for the air conditioner by allowing the refrigerant for the air conditioner to absorb heat, and that allows the refrigerant for the air conditioner to circulate, a refrigerant loop for a battery that allows a refrigerant for the battery to circulate among the battery that accumulates power to be supplied to the electric motor, the evaporating unit that is common to the refrigerant loop for the air conditioner, and a heating device that heats the refrigerant for the battery, and thermal management controlling means that allows the refrigerant for the battery to circulate during charging, during when the battery is in a state of accumulating power supplied from an external power supply, that heats the refrigerant for the battery by using the heating device when temperature of the refrigerant for the battery is lower than target temperature of the refrigerant for the battery, and that allows the refrigerant for the air conditioner to circulate and to absorb heat from the refrigerant for the battery, in the evaporating unit, when the temperature of the refrigerant for the battery is higher than the target temperature of the refrigerant for the battery.

According to another aspect of the present invention, provided is a control method of a thermal management system for an electric vehicle that is used in the electric vehicle driven by an electric motor, in which the thermal management system for the electric vehicle includes a refrigerant loop for an air conditioner that includes a compressing unit for compressing a refrigerant for the air conditioner, a condensing unit for condensing the refrigerant for the air conditioner by radiating heat of the refrigerant for the air conditioner, a pressure reducing unit for expanding and reducing pressure of the refrigerant for the air conditioner, and an evaporating unit for evaporating the refrigerant for the air conditioner by allowing the refrigerant for the air conditioner to absorb heat, and that allows the refrigerant for the air conditioner to circulate, and a refrigerant loop for a battery that allows a refrigerant for the battery to circulate among the battery that accumulates power to be supplied to the electric motor, the evaporating unit that is common to the refrigerant loop for the air conditioner, and a heating device that heats the refrigerant for the battery, in which the control method includes allowing the refrigerant for the battery to circulate during charging, during when the battery is in a state of accumulating power supplied from an external power supply, heating the refrigerant for the battery by using the heating device when temperature of the refrigerant for the battery is lower than target temperature of the refrigerant for the battery, and allowing the refrigerant for the air conditioner to circulate and to absorb heat from the refrigerant for the battery, in the evaporating unit, when the temperature of the refrigerant for the battery is higher than the target temperature of the refrigerant for the battery.

According to these aspects, it is possible to store charging heat generated from the battery at the time of charging the battery, by using heat mass of the refrigerant loop for the battery as a cooling system of the battery. When it is necessary to heat the battery, the refrigerant for the battery is heated by the heating device, and excess heat can be absorbed by the refrigerant loop for the air conditioner. Thus, it is possible to store the charging heat of the battery efficiently, and to control the temperature of the battery within the desired temperature range with more reliability.

Embodiments and advantages of the present invention will be explained in detail with reference to the attached drawings.

DESCRIPTION OF EMBODIMENTS

Figure 1:
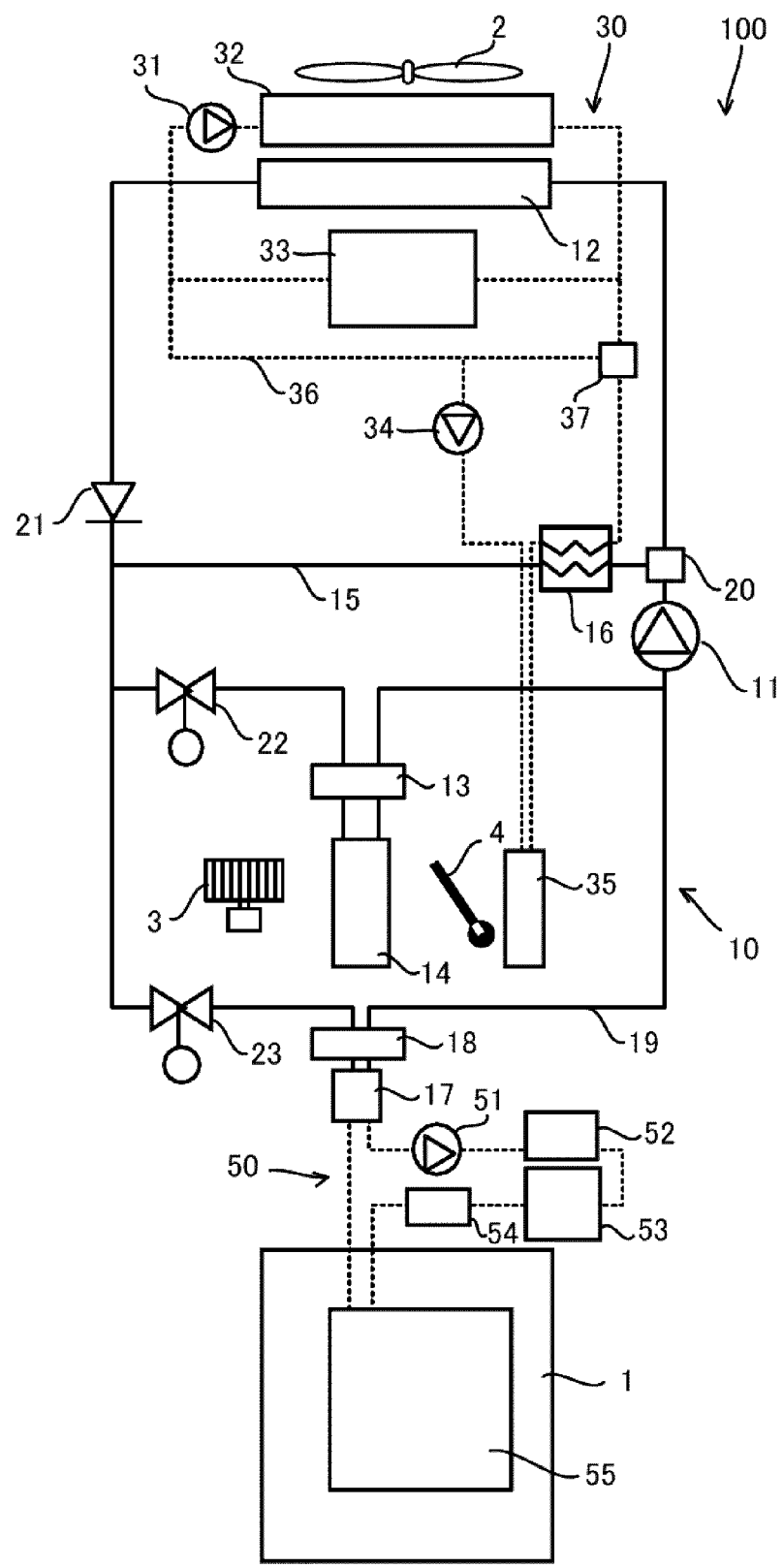
FIG. 1 illustrates the entire constitution of a thermal management system for an electric vehicle according an embodiment of the present invention.

FIG. 1 illustrates the entire constitution of a thermal management system for an electric vehicle 100 according to the present invention.

The thermal management system for the electric vehicle 100 is provided with an air conditioner loop 10, a high water temperature loop 30, and a low water temperature loop 50.

An explanation will be given to the air conditioner loop 10.

The air conditioner loop 10 is a refrigerant circuit that forms a refrigeration cycle in which a refrigerant (such as HFC134a, for example) is circulated in the order of a compressor 11, a condenser 12, an expansion valve 13, and an evaporator 14.

The compressor 11, driven by an electric motor, compresses refrigerant gas and discharges the compressed refrigerant gas having high temperature and high pressure.

The condenser 12 exchanges heat between the compressed refrigerant gas and outside air and radiates the heat of the compressed refrigerant gas to the outside air, so that the compressed refrigerant gas is cooled, condensed, and allowed to be a liquid refrigerant.

The expansion valve 13 expands a high-pressure liquid refrigerant to obtain a low-pressure liquid refrigerant. The expansion valve 13 is a temperature-sensitive expansion valve (TXV), and controls the amount of the refrigerant flowing into the evaporator 14 so that a degree of overheat at an outlet of the evaporator 14 is in a predetermined state that is set in advance.

The evaporator 14 exchanges heat between the liquid refrigerant and air inside a cabin and absorbs the heat of the air inside the cabin, so as to cool the air inside the cabin, and evaporates the liquid refrigerant, so as to obtain the refrigerant gas.

The air conditioner loop 10 is further provided with a bypass passage 15 that connects a downstream side of the compressor 11 and a downstream side of the condenser 12, a water condenser 16 that is provided in the middle of the bypass passage 15, a chiller 17 that is provided in parallel with the evaporator 14, and a passage 19 that allows the refrigerant to flow through an expansion valve 18.

The water condenser 16 is a heat exchanger that is provided on the high water temperature loop 30, and that exchanges heat between the refrigerant flowing through the bypass passage 15 and the refrigerant flowing through the high water temperature loop 30. The chiller 17 is a heat exchanger that is provided on the low water temperature loop 50, and that exchanges heat between the refrigerant in the air conditioner loop 10 and the low water temperature loop 50. Inflow/outflow of the refrigerant in/from the chiller 17 is performed via the temperature-sensitive expansion valve (TXV), similarly to the evaporator 14.

The air conditioner loop 10 is further provided with a three way valve 20 that can switch passages so that refrigerant, discharged from the compressor 11, is allowed to flow to at least either one of the condenser 12 side and the bypass passage 15 side, a check valve 21 that prevents backflow of the refrigerant, flowing through the bypass passage 15, to the condenser 12 side, an evaporator solenoid valve 22 that can open/close the refrigerant passage to the evaporator 14, and a chiller solenoid valve 23 that can open/close the refrigerant passage to the chiller 17.

Next, an explanation will be given to the high water temperature loop 30.

The high water temperature loop 30 allows cooling water (such as an antifreeze, for example) to circulate in the order of a radiator pump 31, a radiator 32, and a motor 33, and also in the order of an H/C pump 34, a heater core 35, and the water condenser 16. Namely, the high water temperature loop 30 is a cooling water circuit that allows the heat, absorbed in at least either one of the motor 33 and the water condenser 16, to be radiated in at least either one of the radiator 32 and the heater core 35.

The radiator pump 31 sends the cooling water to the radiator 32. The radiator 32 cools the cooling water by exchanging heat between the cooling water and air outside the cabin, and releasing the heat of the cooling water to the outside of the cabin. The motor 33 is an electric motor for driving the vehicle, and drives the vehicle by the supply of power from a battery 1.

The H/C pump 34 sends the cooling water to the heater core 35. The heater core 35 heats the air inside the cabin and cools the cooling water by exchanging heat between the cooling water and the air inside the cabin, and releasing the heat of the cooling water into the cabin. The water condenser 16 is a heat exchanger that exchanges heat between the refrigerant in the air conditioner loop 10 and the cooling water in the high water temperature loop 30, and that transfers the heat from the refrigerant to the cooling water.

The high water temperature loop 30 is further provided with a bypass passage 36 that connects a downstream side of the water condenser 16 and an upstream side of the radiator pump so as to bypass the motor 33, and a water switching valve 37 that can switch passages so that the cooling water on the downstream side of the water condenser 16 is allowed to flow to at least either one of the motor 33 side and the bypass passage 36 side.

Next, an explanation will be given to the low water temperature loop 50.

The low water temperature loop 50 allows the cooling water (such as the antifreeze, for example) to circulate in the order of a battery pump 51, a DC/DC converter 52, an inverter 53, a hot water heater 54, a water jacket 55, and the chiller 17.

The battery pump 51 sends the cooling water to the DC/DC converter 52. The DC/DC converter 52 steps down the power supplied from the battery 1 to, for example, 12 V, and outputs it to a power system (a sub-battery or the like) that is different from a drive system (the motor 33, the inverter 53 and the like). The inverter 53 converts DC power of the battery 1 into AC power, according to a required driving force of the vehicle, and supplies it to the motor 33. The battery 1, having a heat insulation structure that can keep a heat insulation property between the battery 1 and the outside air, accumulates the power to be supplied to the motor 33 for driving the vehicle.

The hot water heater 54, such as a PTC heater or the like, heats the cooling water by the heat generated by using the power supplied from the battery 1. The water jacket 55 is a heat exchanger that exchanges heat between the cooling water and the battery 1, and is provided next to the battery 1 so as to increase a contact area with a battery module. The chiller 17 is the heat exchanger that exchanges heat between the cooling water in the low water temperature loop 50 and the refrigerant in the air conditioner loop 10, and that transfers the heat from the refrigerant to the cooling water.

The thermal management system for the electric vehicle 100 is formed by the above-described three loops, and heat is transferred among the respective loops.

Now, an explanation will be given to delivery of heat between the vehicle and the air outside the cabin.

The radiator 32 in the high water temperature loop 30 and the condenser 12 in the air conditioner loop 10 are disposed at positions receiving travelling wind, at the time when the vehicle is travelling. Thereby, during travelling, it is possible to radiate heat from the radiator 32 and the condenser 12 by the travelling wind. In addition, it is also possible to provide an electric-powered condenser fan 2 next to the radiator 32 and the condenser 12, and to forcibly radiate the heat from the radiator 32 and the condenser 12 by operating the condenser fan 2.

Moreover, delivery of heat between the vehicle and the air inside the cabin will be explained.

An air conditioning unit that adjusts temperature inside the cabin is provided with a blower fan 3, the evaporator 14, a mix door 4, and the heater core 35.

Air, taken in by the blower fan 3 selectively from the air inside the cabin or from the outside air, is cooled by the evaporator 14, reheated according to an opening degree of the mix door 4, and thereafter, blown into the cabin from blowout holes to the cabin.

The air may be taken into the air conditioning unit by outside air introduction or inside air circulation, and switching between the outside air introduction and the inside air circulation is made according to an opening degree of an intake door that is provided at the most upstream part of the air conditioning unit. The opening degree of the mix door 4 is set according to target blowout temperature that is set based on set temperature, a detection value of a solar radiation amount sensor and the like. A blowout ratio among a defroster blowout hole, a vent blowout hole, and a foot blowout hole, as the blowout holes to the cabin, is adjusted by opening degrees of a defroster door, a vent door, and a foot door that adjust the opening degrees of the respective blowout holes.

Figure 2:
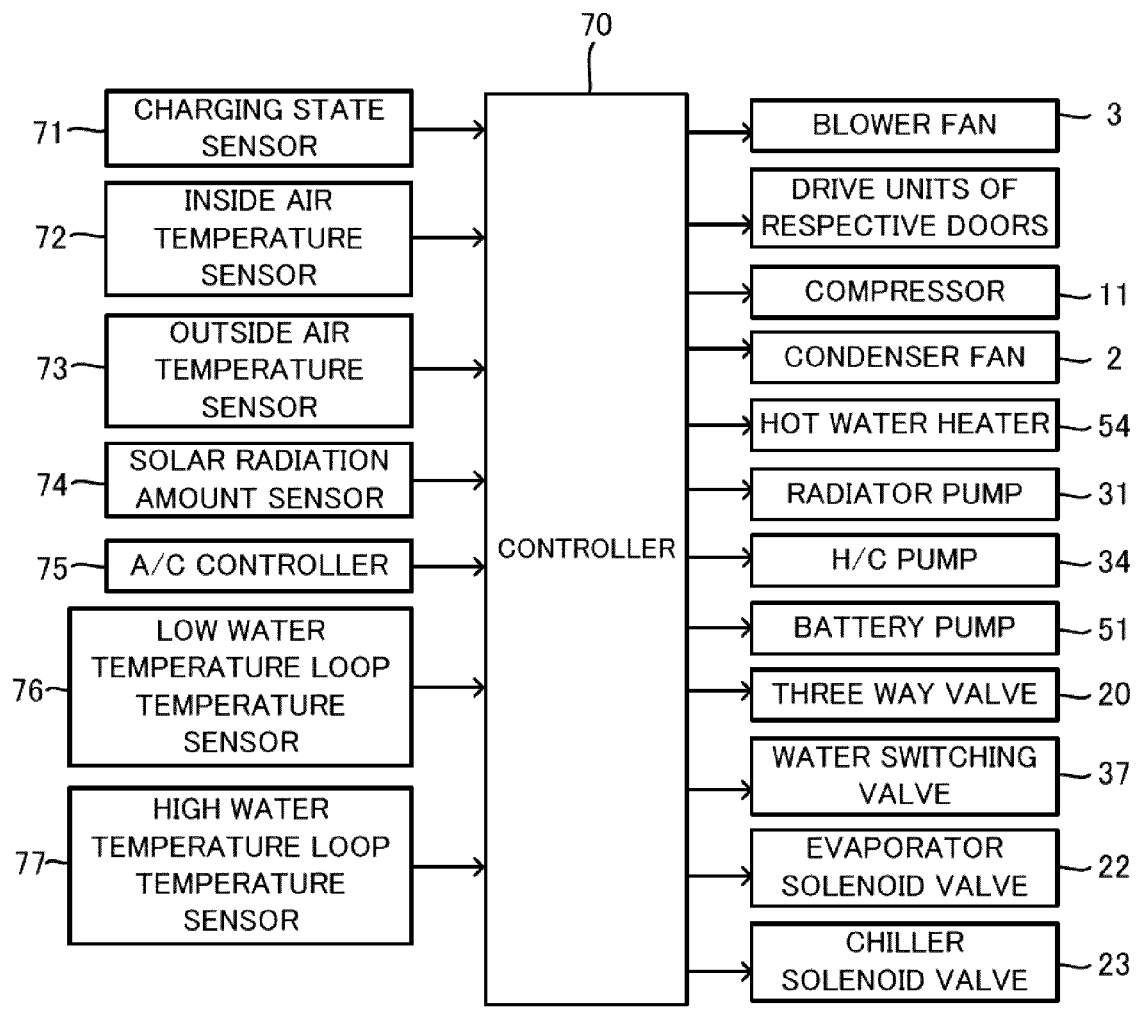
FIG. 2 is a control system chart of the thermal management system for the electric vehicle.

Next, a controller 70 that controls the operation of the thermal management system for the electric vehicle 100 will be explained with reference to FIG. 2.

The controller 70 receives a sensing signal of a charging state sensor 71 that senses that the vehicle is in a charging state, a detecting signal of an inside air temperature sensor 72 that detects the temperature of the air inside the cabin, a detecting signal of an outside air temperature sensor 73 that detects the temperature of the air outside the cabin, a detecting signal of a solar radiation amount sensor 74 that detects a solar radiation amount to be received by the vehicle, set information, such as set temperature and air quantity, that is set by a driver operating an A/C controller 75 installed in an instrument panel, a detecting signal of a low water temperature loop temperature sensor 76 that detects the temperature of the cooling water circulating through the low water temperature loop 50, and a detecting signal of a high water temperature loop temperature sensor 77 that detects the temperature of the cooling water circulating through the high water temperature loop 30.

The controller 70 processes the received various signals, and controls the air quantity of the blower fan 3, the opening degrees of the respective doors, a rotation speed of the compressor 11, the operation of the condenser fan 2, the operation of the hot water heater 54, the operation of the radiator pump 31, the operation of the H/C pump 34, the operation of the battery pump 51, the switching of the three way valve 20, the switching of the water switching valve 37, the opening/closing of the evaporator solenoid valve 22, and the opening/closing of the chiller solenoid valve 23.

Next, the operation of the thermal management system for the electric vehicle 100 will be explained with reference to FIG. 3 to FIG. 6. In the drawings, the part illustrated by a thick line, among the air conditioner loop 10, the high water temperature loop 30, and the low water temperature loop 50, is the circuit through which the refrigerant or the cooling water flows.

Figure 3:
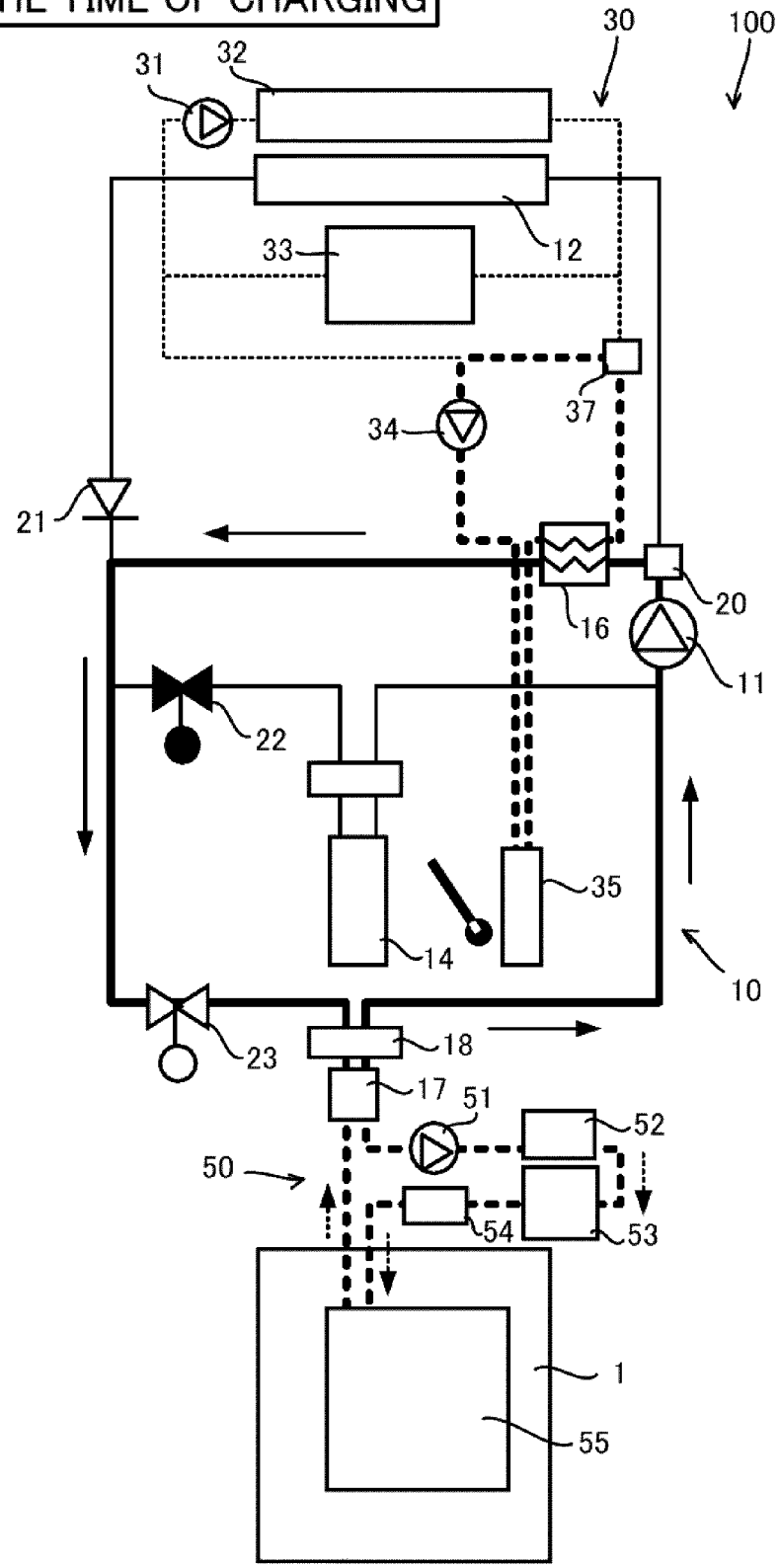
FIG. 3 illustrates an operation state of the thermal management system for the electric vehicle at the time of charging.

FIG. 3 is a circuit diagram illustrating the operation of the thermal management system for the electric vehicle 100 at the time of charging the battery.

In the air conditioner loop 10, the compressor 11 operates and allows the refrigerant to circulate in the order of the three way valve 20, the water condenser 16, the chiller solenoid valve 23, the expansion valve 18, and the chiller 17. As the refrigerant circulation path is restricted by the three way valve 20 and the check valve 21, the refrigerant does not flow to the condenser 12 side. The refrigerant circulation path is also restricted by shut-off of the evaporator solenoid valve 22, and hence the refrigerant does not flow to the evaporator 14.

In the low water temperature loop 50, the battery pump 51 operates and allows the cooling water to circulate in the order of the DC/DC converter 52, the inverter 53, the hot water heater 54, the water jacket 55, and the chiller 17.

In the high water temperature loop 30, the H/C pump 34 operates and allows the cooling water to circulate in the order of the heater core 35, the water condenser 16, and the water switching valve 37. As the cooling water circulation path is restricted by the water switching valve 37, and the radiator pump 31 is not operated, the cooling water does not flow to the motor 33 and the radiator 32.

Thus, at the time of charging the battery, charging heat of the battery 1 and a heat loss of the inverter 53 and the DC/DC converter 52 are absorbed in the cooling water in the low water temperature loop 50, and the cooling water is heated by the hot water heater 54 as necessary. Excess heat of the cooling water is transferred, in the chiller 17, to the refrigerant in the air conditioner loop 10.

Further, in the air conditioner loop 10, heat is transferred, in the water condenser 16, from the high-temperature refrigerant on the discharge side of the compressor 11 to the cooling water in the high water temperature loop 30, and excess heat of the low water temperature loop 50 is absorbed in the chiller 17. In the high water temperature loop 30, the cooling water, heated in the water condenser 16, is circulated to the heater core 35.

Figure 4:
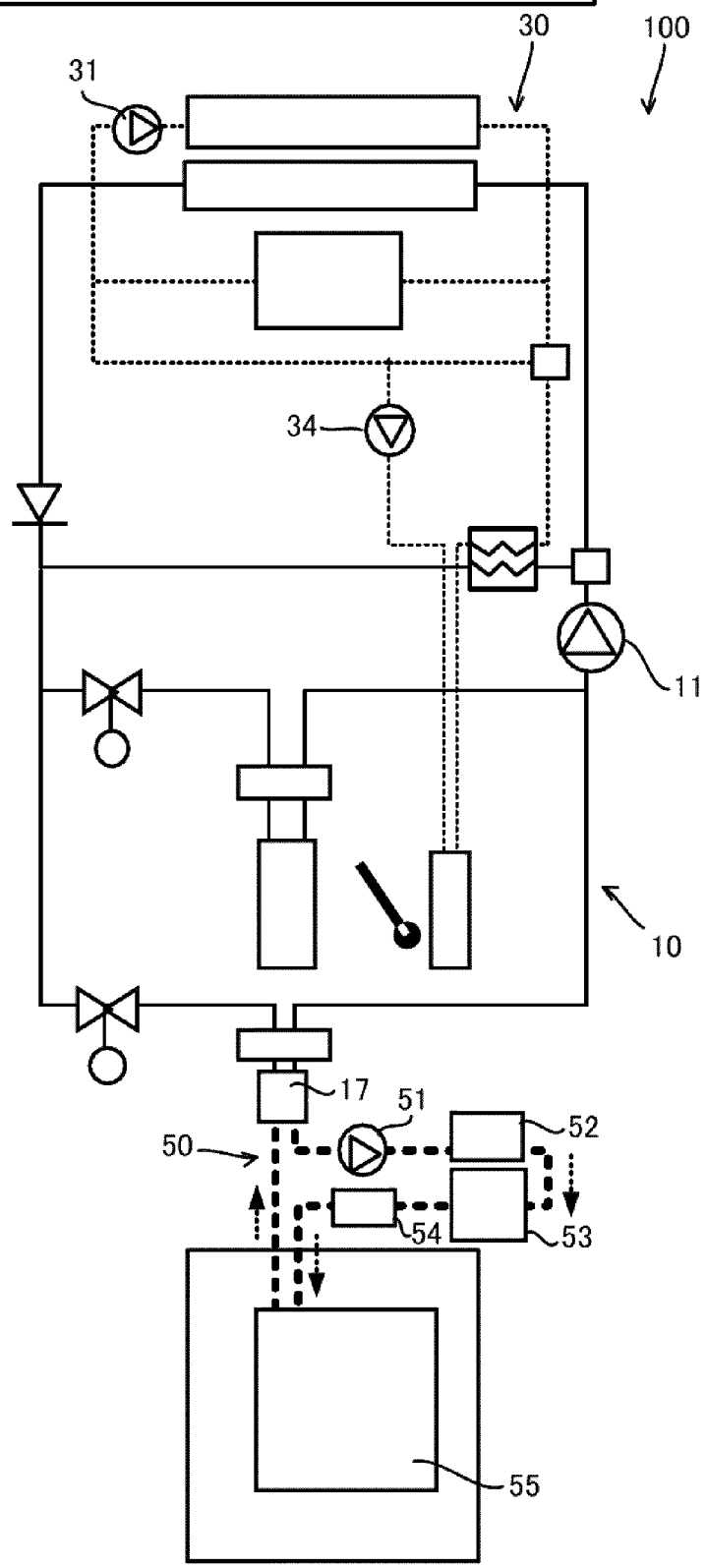
FIG. 4 illustrates the operation state of the thermal management system for the electric vehicle at the time of warming up a battery.

FIG. 4 is a circuit diagram illustrating the operation of the thermal management system for the electric vehicle 100 at the time of warming up the battery.

In this case, the compressor 11, the radiator pump 31, and the H/C pump 34 do not operate, and hence the refrigerant and the cooling water do not circulate through the air conditioner loop 10 and the high water temperature loop 30.

In the low water temperature loop 50, the battery pump 51 operates and allows the cooling water to circulate in the order of the DC/DC converter 52, the inverter 53, the hot water heater 54, the water jacket 55, and the chiller 17. Further, the hot water heater 54 is operated to warm up the cooling water. As the refrigerant is not flowing through the air conditioner loop 10, the heat exchange is not performed in the chiller 17.

Thus, at the time of warming up the battery, the charging heat of the battery 1 and the heat loss of the inverter 53 and the DC/DC converter 52 are absorbed in the cooling water in the low water temperature loop 50, and the cooling water is heated by the hot water heater 54 and circulated with the appropriate temperature, so as to warm up the battery 1.

Figure 5:
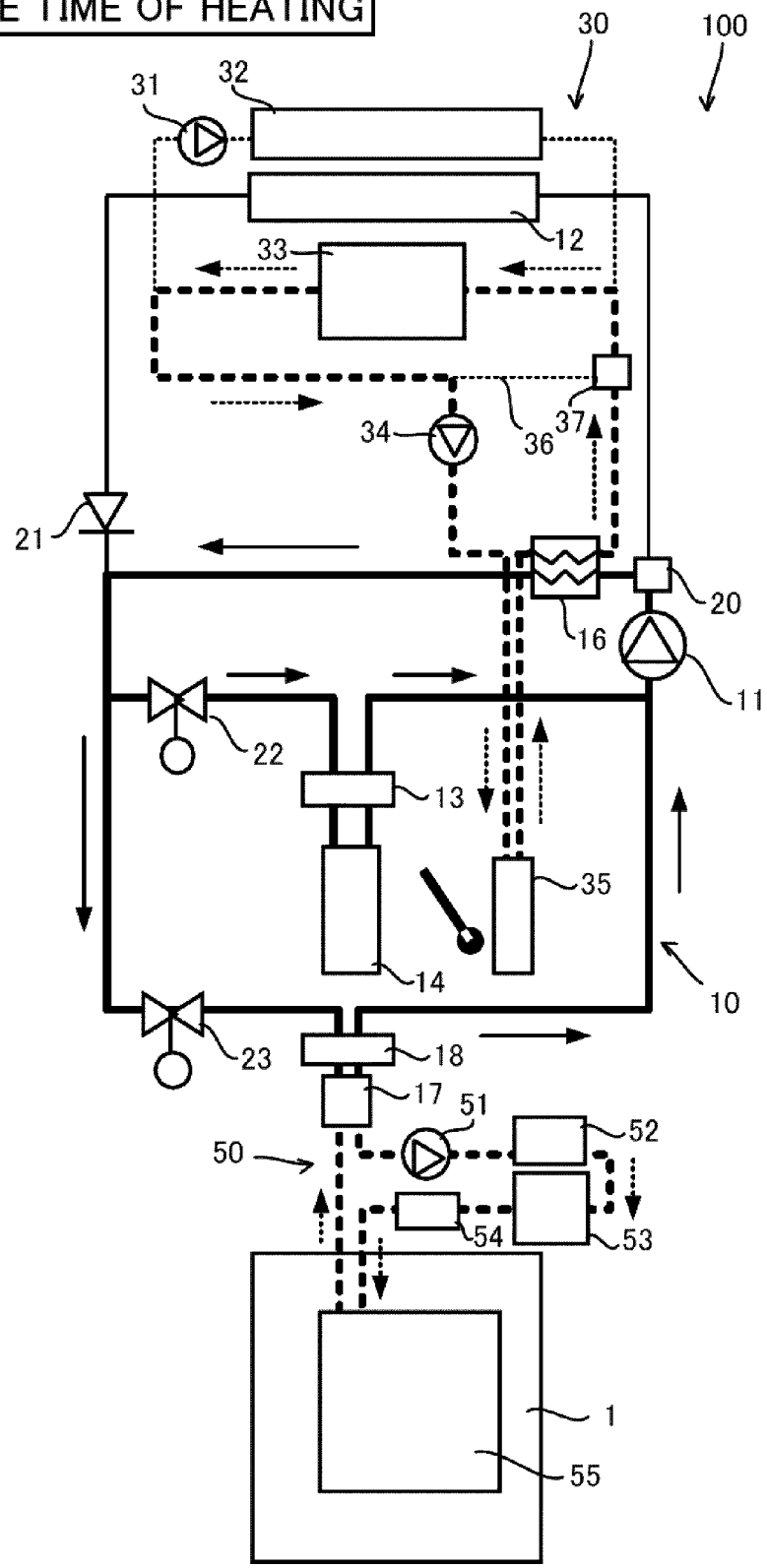
FIG. 5 illustrates the operation state of the thermal management system for the electric vehicle at the time of heating.

FIG. 5 is a circuit diagram illustrating the operation of the thermal management system for the electric vehicle 100 at the time of heating.

In the air conditioner loop 10, the compressor 11 operates and allows the refrigerant to circulate in the order of the three way valve 20, the water condenser 16, the evaporator solenoid valve 22, the expansion valve 13, and the evaporator 14 and, in parallel with this, in the order of the three way valve 20, the water condenser 16, the chiller solenoid valve 23, the expansion valve 18, and the chiller 17. As the refrigerant circulation path is restricted by the three way valve 20 and the check valve 21, the refrigerant does not flow to the condenser 12 side.

In the low water temperature loop 50, the battery pump 51 operates and allows the cooling water to circulate in the order of the DC/DC converter 52, the inverter 53, the hot water heater 54, the water jacket 55, and the chiller 17.

In the high water temperature loop 30, the H/C pump 34 operates and allows the cooling water to circulate in the order of the heater core 35, the water condenser 16, the water switching valve 37, and the motor 33. As the cooling water circulation path is restricted by the water switching valve 37, the cooling water does not flow through the bypass passage 36 between the water switching valve 37 and the H/C pump 34. In addition, as the radiator pump 31 is not operated, the cooling water does not flow to the radiator 32.

Thus, at the time of heating, the charging heat of the battery 1 and the heat loss of the inverter 53 and the DC/DC converter 52 are absorbed in the cooling water in the low water temperature loop 50, and the cooling water is heated by the hot water heater 54 as necessary. Excess heat of the cooling water is transferred, in the chiller 17, to the refrigerant in the air conditioner loop 10.

Further, in the air conditioner loop 10, heat is transferred, by the water condenser 16, from the high-temperature refrigerant on the discharge side of the compressor 11 to the cooling water in the high water temperature loop 30, and the excess heat of the low water temperature loop 50 is absorbed in the chiller 17. In the high water temperature loop 30, the cooling water, heated by the water condenser 16 and waste heat of the motor 33, is circulated to the heater core 35.

Figure 6:
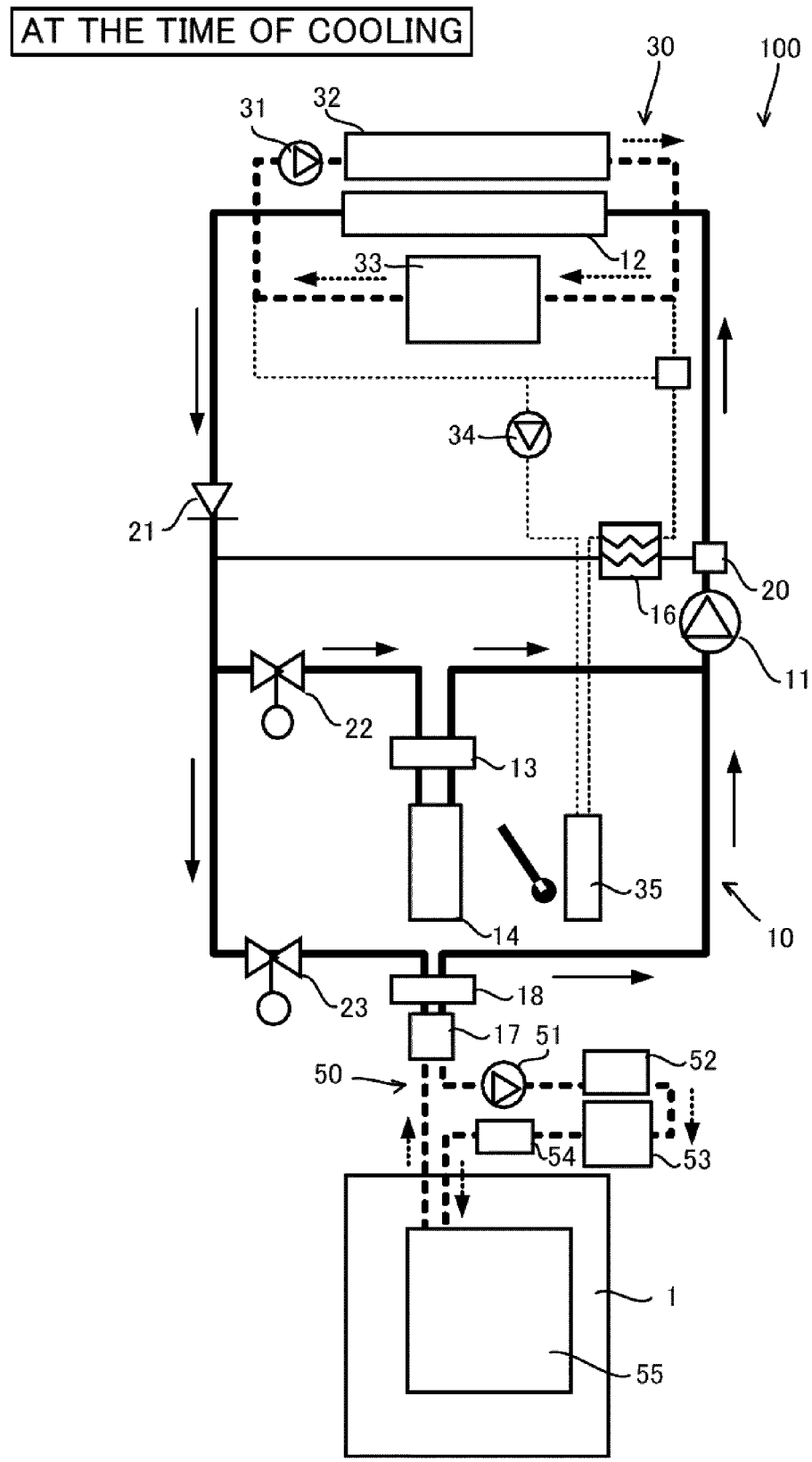
FIG. 6 illustrates the operation state of the thermal management system for the electric vehicle at the time of cooling.

FIG. 6 is a circuit diagram illustrating the operation of the thermal management system for the electric vehicle 100 at the time of cooling.

In the air conditioner loop 10, the compressor 11 operates and allows the refrigerant to circulate in the order of the three way valve 20, the condenser 12, the check valve 21, the evaporator solenoid valve 22, the expansion valve 13, and the evaporator 14. In parallel with this, the air conditioner loop 10 is branched off at the position downstream of the check valve 21, and the refrigerant is circulated in the order of the chiller solenoid valve 23, the expansion valve 18, and the chiller 17. As the refrigerant circulation path is restricted by the three way valve 20, the refrigerant does not flow to the water condenser 16 side.

In the low water temperature loop 50, the battery pump 51 operates and allows the cooling water to circulate in the order of the DC/DC converter 52, the inverter 53, the hot water heater 54, the water jacket 55, and the chiller 17.

In the high water temperature loop 30, the radiator pump 31 operates and allows the cooling water to circulate in the order of the radiator 32, and the motor 33. As the H/C pump 34 does not operate, the cooling water does not flow to the heater core 35, and circulates between the motor 33 and the radiator 32.

Thus, at the time of cooling, the charging heat of the battery 1 and the heat loss of the inverter 53 and the DC/DC converter 52 are absorbed in the cooling water of the low water temperature loop 50. Excess heat of the cooling water is transferred, in the chiller 17, to the refrigerant in the air conditioner loop 10.

Further, in the air conditioner loop 10, heat is absorbed, in the evaporator 14, from air supplied to the cabin, the excess heat of the low water temperature loop 50 is absorbed in the chiller 17, and heat is radiated, in the condenser 12, from the refrigerant to the outside air. In the high water temperature loop 30, the waste heat of the motor 33 is released by the radiator 32.

Figure 7:
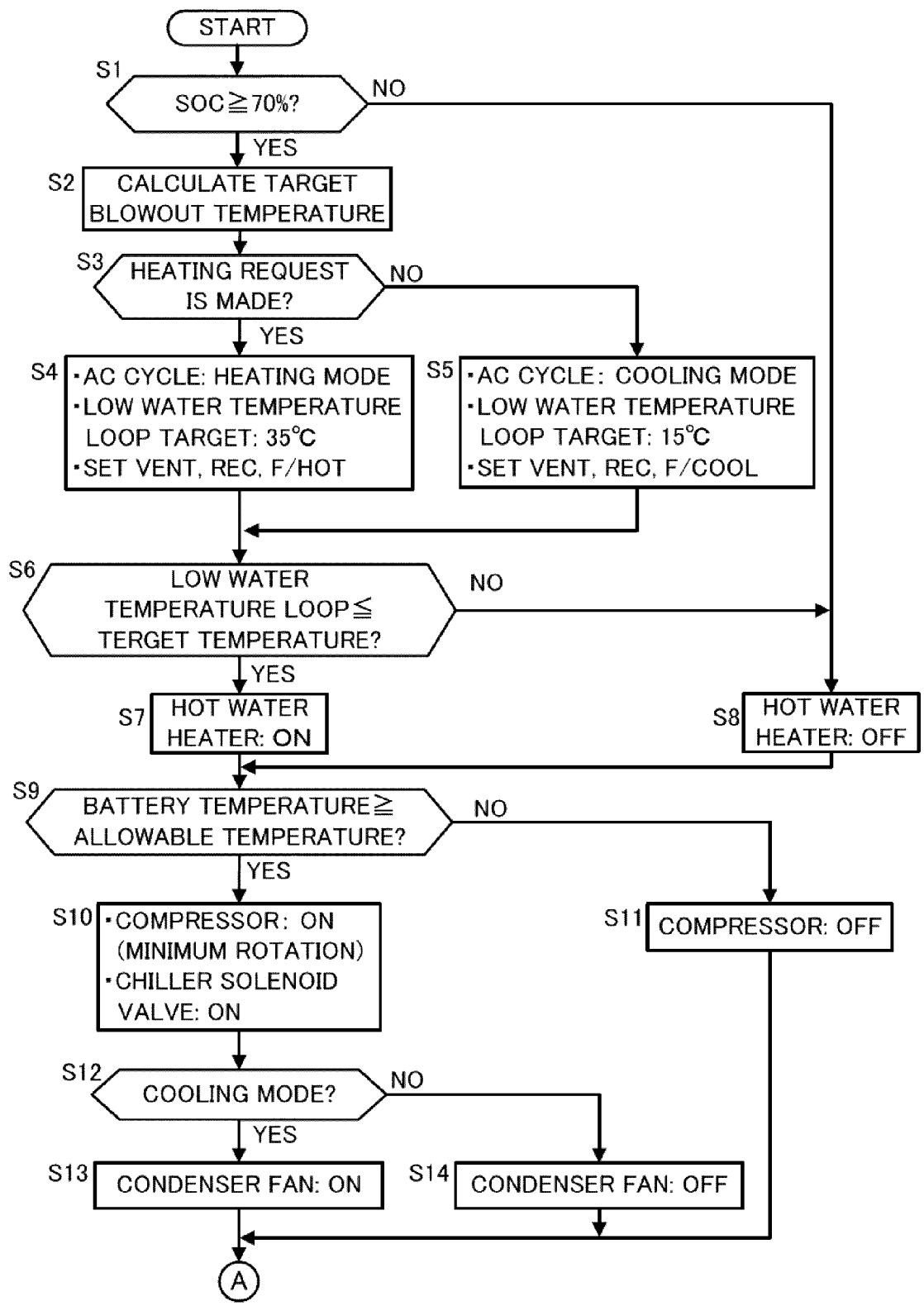
FIG. 7 is a flowchart illustrating the details of processing of the thermal management system for the electric vehicle.
Figure 8:
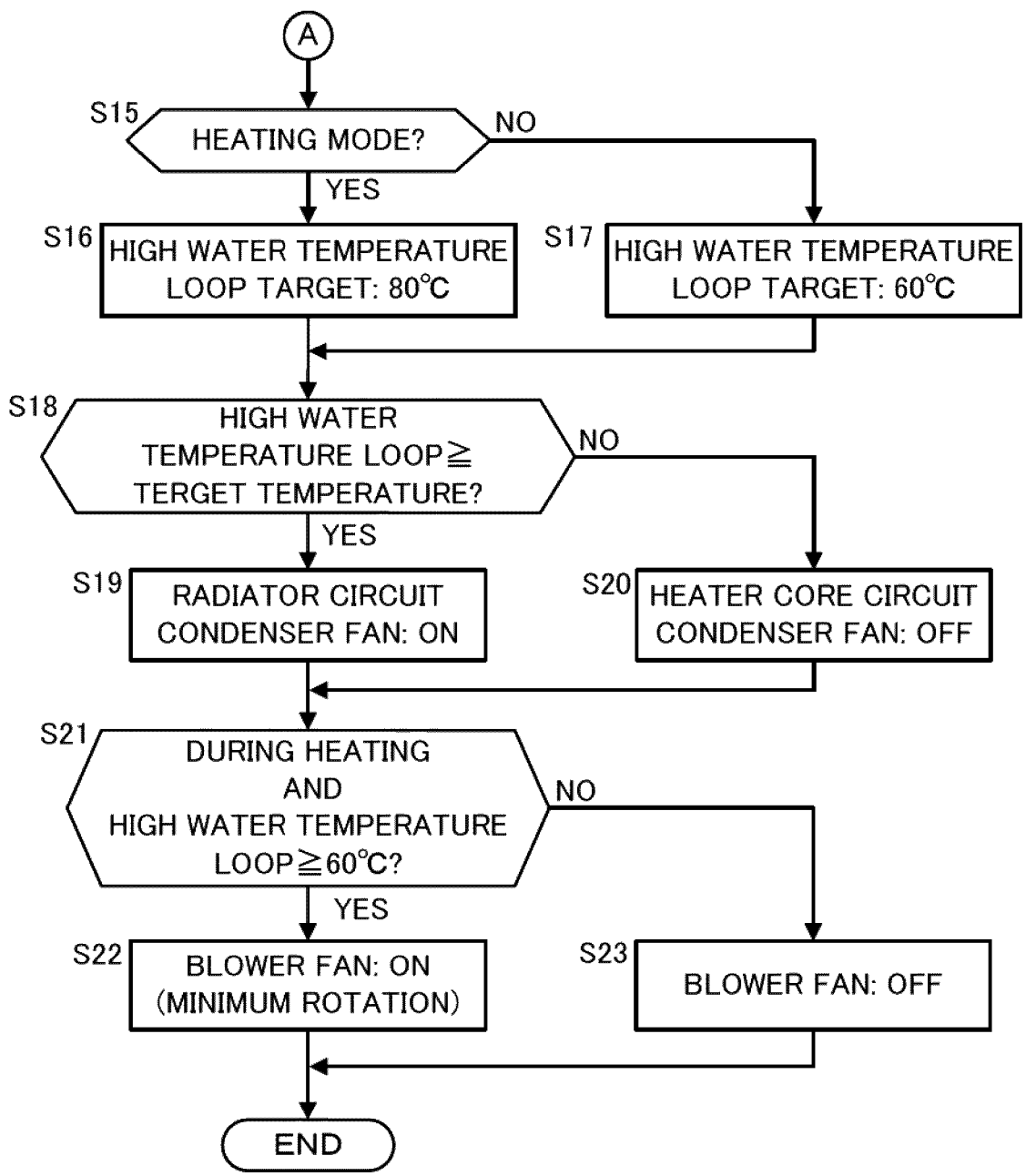
FIG. 8 is a flowchart illustrating the details of the processing of the thermal management system for the electric vehicle.

Next, the details of processing executed by the controller 70 of the thermal management system for the electric vehicle 100 will be explained with reference to FIG. 7 and FIG. 8. FIG. 7 and FIG. 8 are flowcharts illustrating the processing executed by the controller 70 when the vehicle is stopping and when the battery is being charged. Control processing as illustrated in FIG. 7 and FIG. 8 is repeatedly executed per a micro period.

In a step S1, the controller 70 decides whether a state of charge (SOC) of the battery 1 is 70% or more or not. When it is decided that the SOC is 70% or more, the processing proceeds to a step S2, and when it is decided that the SOC is less than 70%, the processing proceeds to a step S8. In order to preferentially use the charging heat that is released at the time of charging the battery, the hot water heater 54 is operated in a step S7 that will be described later, after the SOC becomes 70% or more. Namely, a threshold value (70%) that determines the operation of the hot water heater 54 is appropriately set based on the relationship between the SOC and a generation amount of the charging heat of the battery 1.

In the step S2, the controller 70 calculates the target blowout temperature. The target blowout temperature is calculated based on the set temperature of the air conditioning unit, the temperature of the air inside the cabin, the temperature of the outside air, the solar radiation amount to be received by the vehicle, and the like. When, for example, an automatic mode is set by the driver pressing an AUTO switch in the A/C controller 75, the target blowout temperature is calculated automatically in such a manner that the temperature of the air inside the cabin becomes the set temperature. Incidentally, this control processing is executed at the time of charging the battery, during when the driver is not seated (plug-in state). Therefore, the set temperature that is set for the case where the driver stops the vehicle and makes the plug-in state is referred to, as the set temperature of the A/C controller 75.

In a step S3, the controller 70 decides whether a heating request is made or not. When it is decided that the heating request is made, the processing proceeds to a step S4, and when it is decided that the heating request is not made, the processing proceeds to a step S5. Whether the heating request is made or not is determined based on the target blowout temperature and the temperature of the air inside the cabin. For example, it is determined that the heating request is made when the target blowout temperature is higher than the temperature of the air inside the cabin, and it is determined that a cooling request is made when the target blowout temperature is lower than the temperature of the air inside the cabin.

In the step S4, the controller 70 sets an air conditioning cycle of the air conditioning unit to a heating mode. Thus, the target temperature of the low water temperature loop 50 is set at 35° C. The intake door is driven to the position of the inside air circulation (REC), and the defroster door is driven so that the defroster blowout hole is brought into an open state (DEF). The mix door 4 is driven to a full-hot position (F/HOT) with which all the air, passing through the evaporator 14 in the air conditioning unit, passes through the heater core 35.

In the step S5, the controller 70 sets the air conditioning cycle of the air conditioning unit to a cooling mode. Thereby, the target temperature of the low water temperature loop 50 is set at 15° C. The intake door is driven to the position of the inside air circulation (REC), and the vent door is driven so that the vent blowout hole is brought into an open state (VENT). The mix door 4 is driven to a full-cool position (F/COOL) with which all the air, passing through the evaporator 14 in the air conditioning unit, does not pass through the heater core 35.

As the temperature of the cooling water in the low water temperature loop 50 is almost equal to the temperature of the battery 1, the target temperature (35° C., 15° C.) that is set in the steps S4 or S5 is set to be an upper limit value or a lower limit value of the temperature that is preferable for the operation, based on specifications of the battery 1.

In a step S6, the controller 70 decides whether the temperature of the cooling water in the low water temperature loop 50 is equal to or less than the target temperature of the low water temperature loop 50 or not. When it is decided that the temperature of the cooling water is the target temperature or less, the processing proceeds to the step S7, and when it is decided that the temperature is higher than the target temperature, the processing proceeds to the step S8. The target temperature means the target temperature of the low water temperature loop 50 that is set in the step S4 or the step S5.

In the step S7, the controller 70 operates the hot water heater 54.

In the step S8, the controller 70 stops the hot water heater 54.

In a step S9, the controller 70 decides whether the temperature of the battery is allowable temperature or more or not. When it is decided that the temperature of the battery is the allowable temperature or more, the processing proceeds to a step S10, and when it is decided that the temperature is less than the allowable temperature, the processing proceeds to a step S11. The allowable temperature means the target temperature of the low water temperature loop 50 that is set in the step S4 or S5.

In the step S10, the controller 70 drives the compressor 11 in such a manner that the compressor 11 rotates with a minimum rotation speed, and opens the chiller solenoid valve 23.

In the step S11, the controller 70 stops the compressor 11.

Namely, when the temperature of the cooling water in the low water temperature loop 50 exceeds the allowable temperature of the battery 1, only by the charging heat of the battery 1 and the waste heat of the DC/DC converter 52 and the inverter 53, the compressor 11 is driven to forcibly cool the cooling water.

In a step S12, the controller 70 decides whether the air conditioning cycle is in the cooling mode or not. When it is decided that the air conditioning cycle is in the cooling mode, the processing proceeds to a step S13, and when it is decided that the air conditioning cycle is in the heating mode, the processing proceeds to a step S14.

In the step S13, the controller 70 operates the condenser fan 2. Namely, in the cooling mode, heat is radiated in the condenser 12.

In the step S14, the controller 70 stops the condenser fan 2.

Moving on to FIG. 8 and in a step S15, the controller 70 decides whether the air conditioning cycle is in the heating mode or not. When it is decided that the air conditioning cycle is in the heating mode, the processing proceeds to a step S16, and when it is decided that the air conditioning cycle is in the cooling mode, the processing proceeds to a step S17.

In the step S16, the controller 70 sets the target temperature of the high water temperature loop 30 at 80° C. When it is in the heating mode, the target temperature is set relatively high because the cabin is preheated by using condensing heat of the water condenser 16.

In the step S17, the controller 70 sets the target temperature of the high water temperature loop 30 at 60° C.

In a step S18, the controller 70 decides whether the temperature of the cooling water in the high water temperature loop 30 is equal to or more than the target temperature of the high water temperature loop 30 or not. When it is decided that the temperature of the cooling water is the target temperature or more, the processing proceeds to a step S19, and when it is decided that the temperature is less than the target temperature, the processing proceeds to a step S20.

In the step S19, the controller 70 allows the high water temperature loop 30 to function as a radiator circuit, and operates the condenser fan 2. The radiator circuit means a heater core circuit, in which the cooling water in the high water temperature loop 30 circulates through the heater core 35, as illustrated in FIG. 3, added with a circuit, in which the cooling water also circulates through the radiator 32 by the driven radiator pump 31. In the radiator circuit, the cooling water discharges the heat that is absorbed in the water condenser 16 to the cabin, in the heater core 35, and also discharges the heat to the outside of the cabin, in the radiator 32. Namely, in the step S18, when the temperature of the cooling water in the high water temperature loop 30 exceeds the target temperature, the cooling water in the high water temperature loop 30 is forcibly cooled by the radiation by the radiator.

In the step S20, the controller 70 allows the high water temperature loop 30 to function as the heater core circuit, and stops the condenser fan 2. The heater core circuit means a circuit in which the cooling water in the high water temperature loop 30 circulates through the heater core 35 and the water condenser 16, as illustrated in FIG. 3. In this case, the cooling water in the high water temperature loop 30 is not radiated by the radiator.

In a step S21, the controller 70 decides whether it is during the heating or not and whether the temperature of the cooling water in the high water temperature loop 30 is 60° C. or more or not. When it is decided that the conditions are satisfied, the processing proceeds to a step S22, and when it is decided that the conditions are not satisfied, the processing proceeds to a step S23. A threshold value of the decision, which is 60° C. in this step, is appropriately set as a value by which such determination can be made that the temperature of the heater core is high enough to preheat the cabin by operating the blower fan 3.

In the step S22, the controller 70 drives the blower fan 3 to rotate with a minimum rotation speed. Thereby, during the heating mode, warm air is supplied into the cabin so as to preheat the cabin.

In the step S23, the controller 70 stops the blower fan 3.

Next, the function of the thermal management system for the electric vehicle 100 at the time of charging the battery will be explained with reference to FIG. 9 to FIG. 11.

Figure 9:
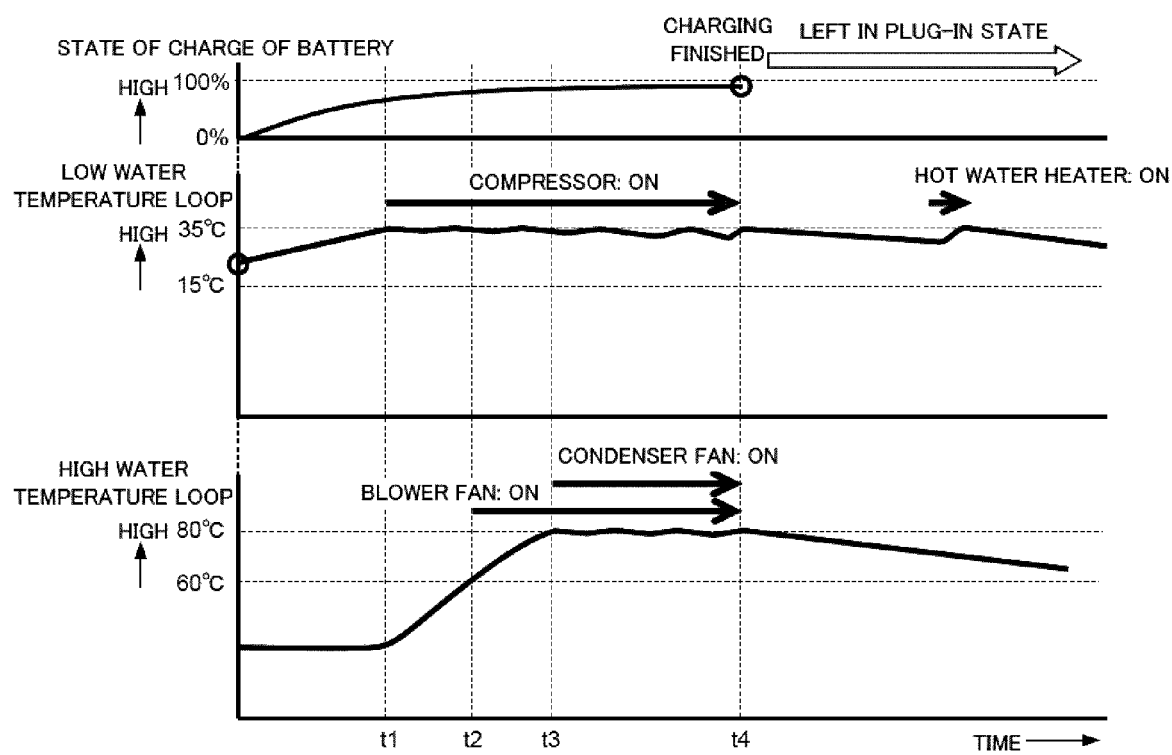
FIG. 9 is a time chart illustrating changes in a state of charge and water temperature.

FIG. 9 illustrates the case where the battery 1, which is already warmed up after the travelling of the vehicle, is charged in winter or the like when the temperature of the outside air is low. In this case, the air conditioning cycle is set to the heating mode, the target temperature of the low water temperature loop 50 is set at 35° C., and the target temperature of the high water temperature loop 30 is set at 80° C.

When the battery 1 is charged, the state of charge increases. At this time, the charging heat that is generated together with the charging is absorbed in the cooling water in the low water temperature loop 50, via the water jacket 55. As the cooling water is circulated by the battery pump 51, the temperature of the cooling water in the low water temperature loop 50 increases gradually.

When the temperature of the cooling water becomes equal to or more than the allowable temperature of the battery 1 (35° C.) at a time t1, the chiller solenoid valve 23 is opened and the compressor 11 is operated. In this case, the compressor 11 is operated with nearly minimum rotation speed, and controlled in such a manner that the temperature of the cooling water does not exceed the allowable temperature (35° C.). As the refrigerant in the air conditioner loop 10 circulates by the operation of the compressor 11, the heat of the cooling water in the low water temperature loop 50 is absorbed in the refrigerant, via the chiller 17.

The heat of the refrigerant, absorbed in the chiller 17, is absorbed in the cooling water in the high water temperature loop 30, via the water condenser 16. As the compressor 11 is operated in the air conditioner loop 10, the amount of heat radiation in the water condenser 16 is the amount of heat obtained by adding the amount of heat absorbed in the chiller 17 and the work of the compressor 11. Thereby, the temperature of the cooling water in the high water temperature loop 30 increases gradually.

When the temperature of the cooling water in the high water temperature loop 30 exceeds 60° C. at a time t2, the blower fan 3 is operated with the minimum rotation speed. Thereby, the air, heated in the heater core 35, is blown out into the cabin, and the cabin is preheated.

When the temperature of the cooling water in the high water temperature loop 30 exceeds the target temperature (80° C.) at a time t3, the high water temperature loop 30 is allowed to function as the radiator circuit, and the condenser fan 2 is operated. Thereby, the heat of the cooling water in the high water temperature loop 30 is released via the radiator 32 to the outside air.

When the charging is completed at a time t4, the compressor 11, the condenser fan 2, and the blower fan 3 stop. The charging heat of the battery 1 is not generated after that, and therefore, the temperature of the cooling water in the low water temperature loop 50 is reduced gradually by natural heat radiation. In this case, however, the hot water heater 54 is operated, and such control is made that the temperature of the cooling water becomes the vicinity of the target temperature of the low water temperature loop 50 (35° C.).

Figure 10:
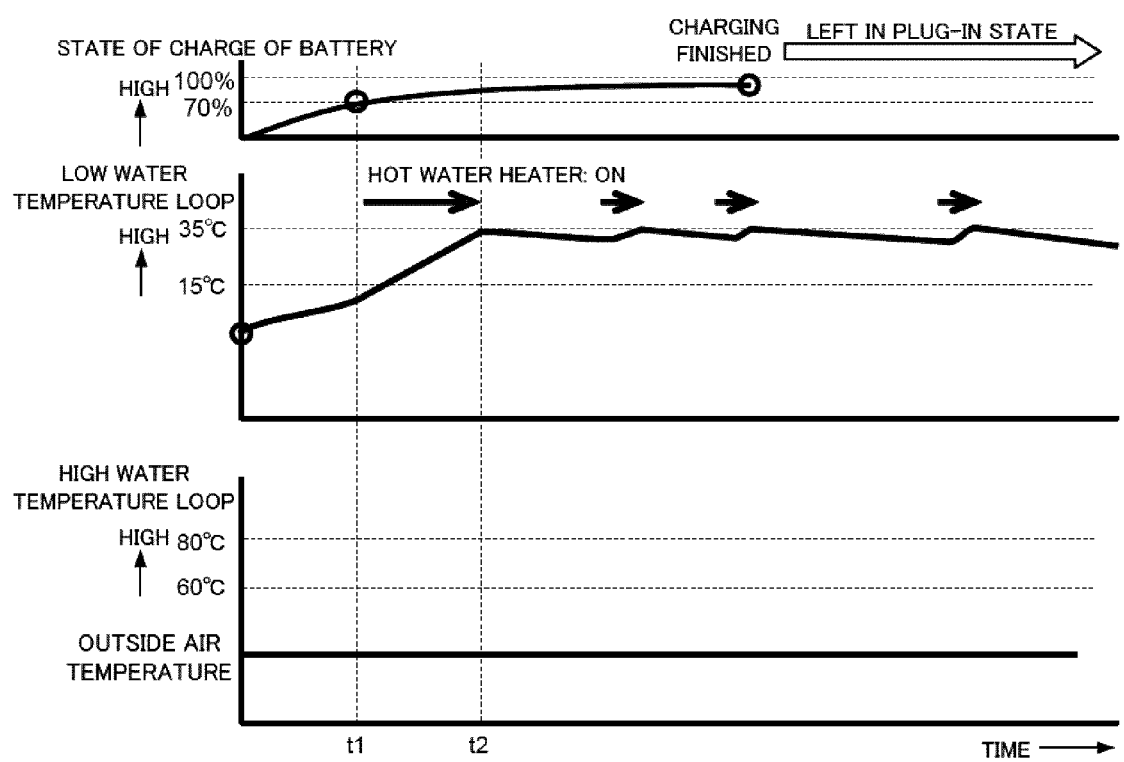
FIG. 10 is a time chart illustrating changes in the state of charge and the water temperature.

FIG. 10 illustrates the case where the battery 1, which is cold in winter or the like when the temperature of the outside air is low, is charged. In this case, the air conditioning cycle is set to the heating mode, the target temperature of the low water temperature loop 50 is set at 35° C., and the target temperature of the high water temperature loop 30 is set at 80° C.

When the battery 1 is charged, the state of charge increases. At this time, the charging heat that is generated together with the charging is absorbed in the cooling water in the low water temperature loop 50, via the water jacket 55. As the cooling water is circulated by the battery pump 51, the temperature of the cooling water in the low water temperature loop 50 increases gradually.

At a time t1, the state of charge of the battery becomes 70% or more. At this time, the temperature of the cooling water in the low water temperature loop 50 is equal to or lower than the target temperature of the low water temperature loop 50 (35° C.), and thus the hot water heater 54 is operated and the cooling water is heated. Namely, the charging heat is used preferentially to heat the cooling water until the state of charge of the battery reaches 70% and, when the temperature of the cooling water does not reach the target temperature (35° C.) even when the state of charge reaches 70%, the hot water heater 54 is used to heat the cooling water.

When the temperature of the cooling water in the low water temperature loop 50 reaches the target temperature (35° C.) at a time t2, the hot water heater 54 is stopped. Thereafter, when the temperature is reduced due to the natural heat radiation, the hot water heater 54 is operated again. Thus, the hot water heater 54 is turned on/off so that the temperature of the cooling water becomes the vicinity of the target temperature of the low water temperature loop 50 (35° C.).

Meanwhile, the compressor 11 is stopped and the refrigerant is not circulated in the air conditioner loop 10. As heat absorption is not made in the high water temperature loop 30, via the water condenser 16, the temperature of the cooling water in the high water temperature loop 30 converges to the vicinity of the temperature of the outside air.

Figure 11:
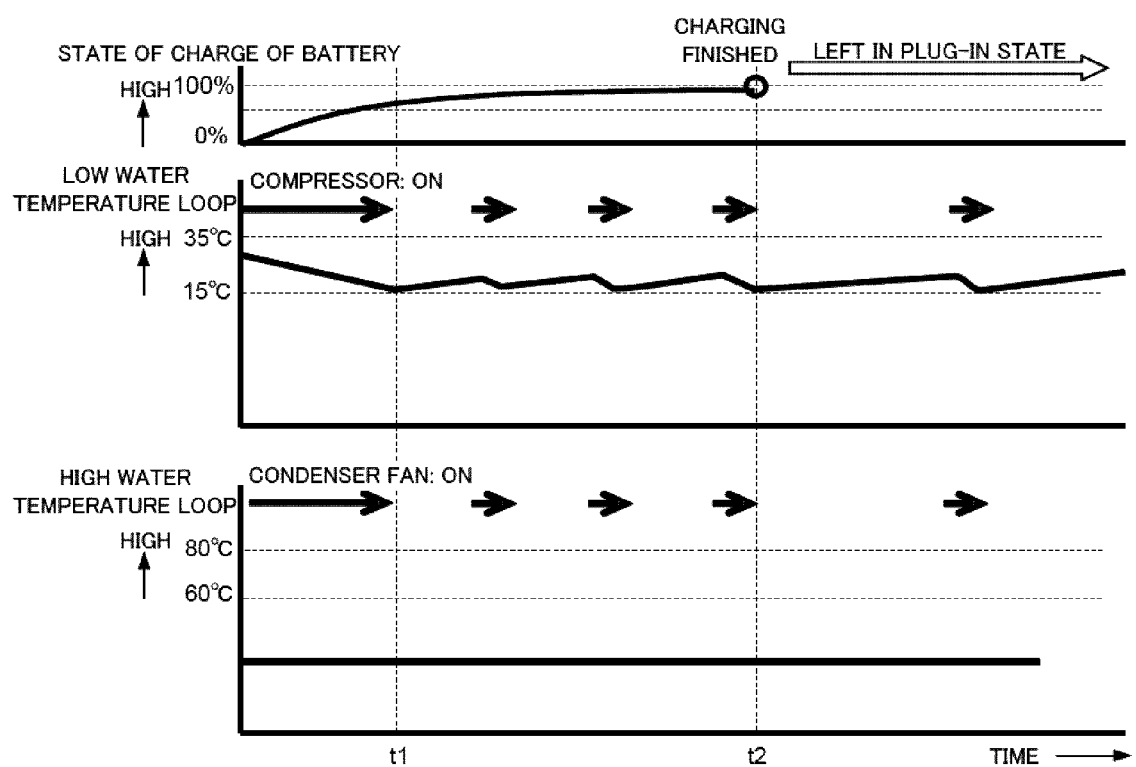
FIG. 11 is a time chart illustrating changes in the state of charge and the water temperature.

FIG. 11 illustrates the case where the battery 1 is charged, in summer or the like when the temperature of the outside air is high. In this case, the air conditioning cycle is set to the cooling mode, the target temperature of the low water temperature loop 50 is set at 15° C., and the target temperature of the high water temperature loop 30 is set at 60° C.

When the battery 1 is charged, the state of charge increases. As the temperature of the cooling water in the low water temperature loop 50 is higher than the allowable temperature of the battery (15° C.), the compressor 11 is operated simultaneously with the start of the charging. The charging heat that is generated together with the charging is absorbed in the cooling water in the low water temperature loop 50, via the water jacket 55. As the cooling water is circulated by the battery pump 51, the heat is absorbed in the refrigerant in the air conditioner loop 10, via the chiller 17. Thereby, the temperature of the cooling water in the low water temperature loop 50 is reduced gradually.

Further, the condenser fan 2 is operated together with the operation of the compressor 11, and hence the heat of the refrigerant in the air conditioner loop 10 is radiated from the condenser 12.

When the temperature of the cooling water in the low water temperature loop 50 is reduced to the allowable temperature of the battery (15° C.) at a time t1, the compressor 11 and the condenser fan 2 are stopped. Thereby, the temperature of the cooling water in the low water temperature loop 50 gradually increases by the charging heat, and the compressor 11 and the condenser fan 2 are operated again. Thus, the compressor 11 and the condenser fan 2, operated together with the compressor 11, are turned on/off so that the temperature of the cooling water becomes the vicinity of the target temperature (15° C.) of the low water temperature loop 50.

Meanwhile, in the air conditioner loop 10, the refrigerant, discharged from the compressor 11, is flowed to the condenser 12 side, not to the water condenser 16. Thus, heat is not absorbed in the high water temperature loop 30, via the water condenser 16. Therefore, the temperature of the cooling water in the high water temperature loop 30 converges to the vicinity of the temperature of the outside air.

When the charging is completed at a time t2, the temperature of the cooling water in the low water temperature loop 50 increases gradually by natural heat absorption, as the charging heat of the battery 1 is not generated. In this case, however, the compressor 11 and the condenser fan 2 are operated, and such control is made that the temperature of the cooling water becomes the vicinity of the target temperature (15° C.) of the low water temperature loop 50.

According to this embodiment as described thus far, it is possible to store the charging heat, generated from the battery 1 at the time of charging the battery 1, by using the heat mass of the low water temperature loop 50 as the cooling system of the battery 1, and to absorb the excess heat by the heat-pump type air conditioner loop 10. Thus, the charging heat of the battery 1 can be stored efficiently, and the temperature of the battery can be controlled within the desired temperature range. As it is not necessary to operate the air conditioner loop 10 at the time of heating the battery 1, power efficiency can be improved.

Further, when the air conditioning cycle is in the heating mode, the target temperature of the low water temperature loop 50 is set at 35° C., and when the air conditioning cycle is in the cooling mode, the target temperature of the low water temperature loop 50 is set at 15° C. This makes it possible to control the battery 1 within the desired temperature range, at the time of charging. When the air conditioning cycle is in the heating mode in particular, the heat stored at the time of charging can be used as a heat source for the heating during travelling, which makes it possible to reduce the amount of power consumed by the heating during travelling, and to suppress the reduction in the cruising distance of the vehicle.

Furthermore, there is provided the high water temperature loop 30 having the water condenser 16 that absorbs the heat of the refrigerant discharged from the compressor 11 of the air conditioner loop 10. Thus, the heat, absorbed from the refrigerant in the air conditioner loop 10 via the water condenser 16, can be stored in the cooling water in the high water temperature loop 30, and the charging heat of the battery 1 can be stored more efficiently.

Further, when the temperature of the cooling water in the high water temperature loop 30 reaches the temperature that can perform the heating, at the time of charging the battery, the heat is radiated from the heater core 35, and the blower fan 3 is operated to blow out the warm air into the cabin. Thus, the cabin can be preheated at the time of charging.

Furthermore, when the temperature of the cooling water in the high water temperature loop 30 exceeds the target temperature of the high water temperature loop 30, at the time of charging the battery, the high water temperature loop 30 is allowed to function as the radiator circuit, and the condenser fan 2 is operated. Thus, the excess heat at the time of charging can be radiated to the outside air, and the reduction in durability of the motor 33 can be prevented.

Further, when the battery is being charged and when the air conditioning cycle is in the cooling mode, the condenser fan 2 is rotated together with the driving of the compressor 11. This makes it possible to prevent the reduction in the durability of the motor 33 as the temperature of the high water temperature loop 30 increases at the time of charging in summer or the like when the temperature is high.

Further, when the temperature of the cooling water in the low water temperature loop 50 is equal to or less than the target temperature of the low water temperature loop 50, the electric hot water heater 54 that is operated by the power supplied from the battery 1 is used. This makes it possible to use the chiller 17 specially for transferring heat from the low-temperature cooling water to the refrigerant side, and to avoid the reduction in a following property of the air conditioner loop 10, due to up-and-down fluctuations in the temperature of the battery.

Further, the chiller 17 is connected in parallel with the evaporator 14 in the air conditioner loop 10 and, at the time of charging, the refrigerant is allowed to flow only through the chiller 17, not through the evaporator 14. This makes it possible to improve heat exchange efficiency of the chiller 17, and to absorb the charging heat of the battery 1 more efficiently.

Next, modification examples of the thermal management system for the electric vehicle 100 will be explained with reference to FIG. 12 to FIG. 17.

Figure 12:
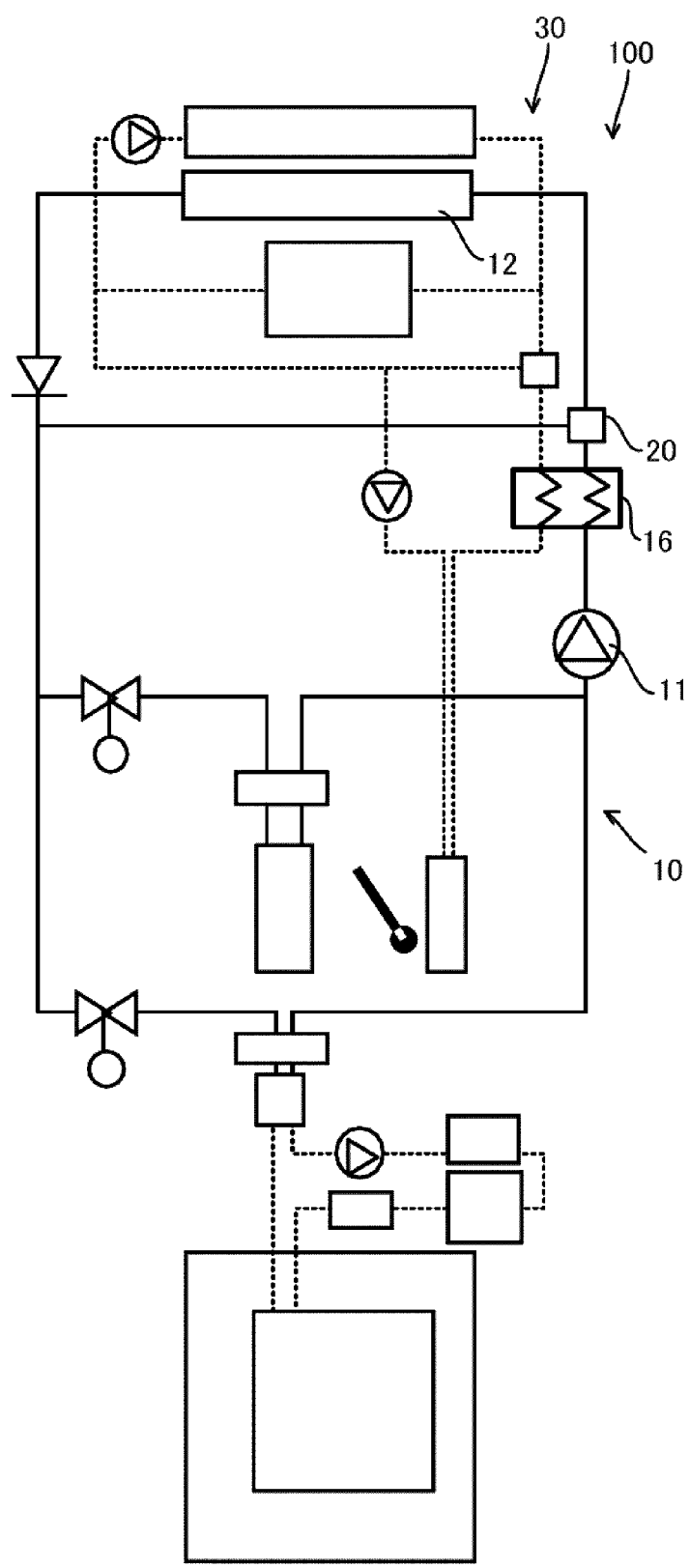
FIG. 12 illustrates the entire constitution of the thermal management system for the electric vehicle according another embodiment.

FIG. 12 illustrates a first modification example of the thermal management system for the electric vehicle 100.

According to the first modification example, the position where the water condenser 16 is provided is different from that of the above-described embodiment. The water condenser 16 is disposed at the same position in the high water temperature loop 30, but in the air conditioner loop 10, it is provided between the compressor 11 and the three way valve 20. Namely, the water condenser 16 and the condenser 12 are provided in parallel with each other along the air conditioner loop 10 according to the above-described embodiment. However, according to this modification example, the water condenser 16 and the condenser 12 are provided in series. Thereby, the cooling water in the high water temperature loop 30 absorbs heat from the refrigerant at all times, irrespective of the switching position of the three way valve 20, which makes it possible to improve a heat radiation property of the air conditioner loop 10.

Figure 13:
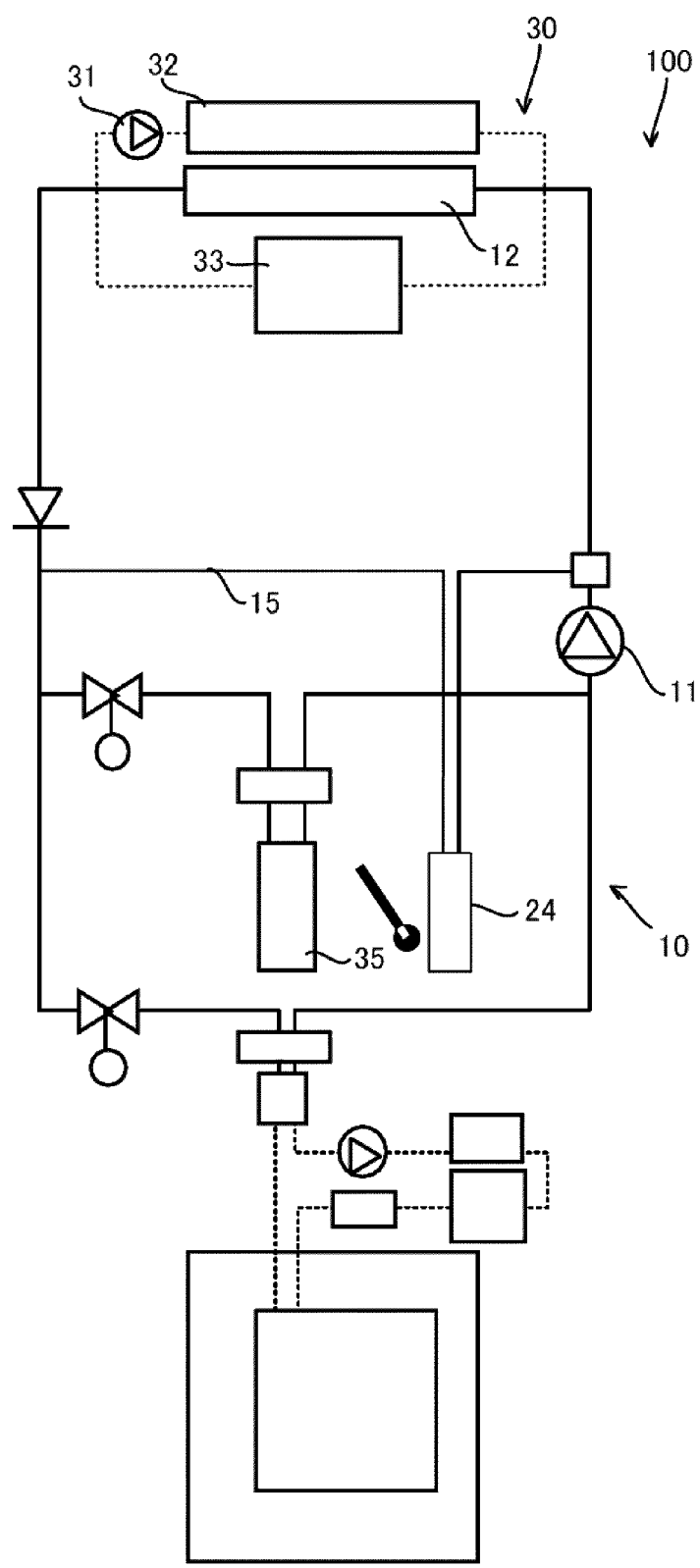
FIG. 13 illustrates the entire constitution of the thermal management system for the electric vehicle according still another embodiment.

FIG. 13 illustrates a second modification example of the thermal management system for the electric vehicle 100.

According to the second modification example, the structure of the high water temperature loop 30 and the air conditioner loop 10 is different from that of the above-described embodiment. With regard to the high water temperature loop 30, the water condenser 16, the water switching valve 37, the H/C pump 34, and the heater core 35 are removed from the high water temperature loop 30 of the above-described embodiment, so as to obtain a circuit in which the cooling water, sent from the radiator pump 31, circulates through the radiator 32 and the motor 33.

In addition, in the air conditioner loop 10, an inner condenser 24 is provided on the bypass passage 15 that connects the downstream side of the compressor 11 and the downstream side of the condenser 12. The inner condenser 24 is provided inside the air conditioning unit, similarly to the heater core 35 of the above-described embodiment.

According to this modification example, the water condenser 16 is omitted and hence the heat exchange cannot be performed between the air conditioner loop 10 and the high water temperature loop 30. However, it is possible to simplify the structure of the high water temperature loop 30.

Figure 14:
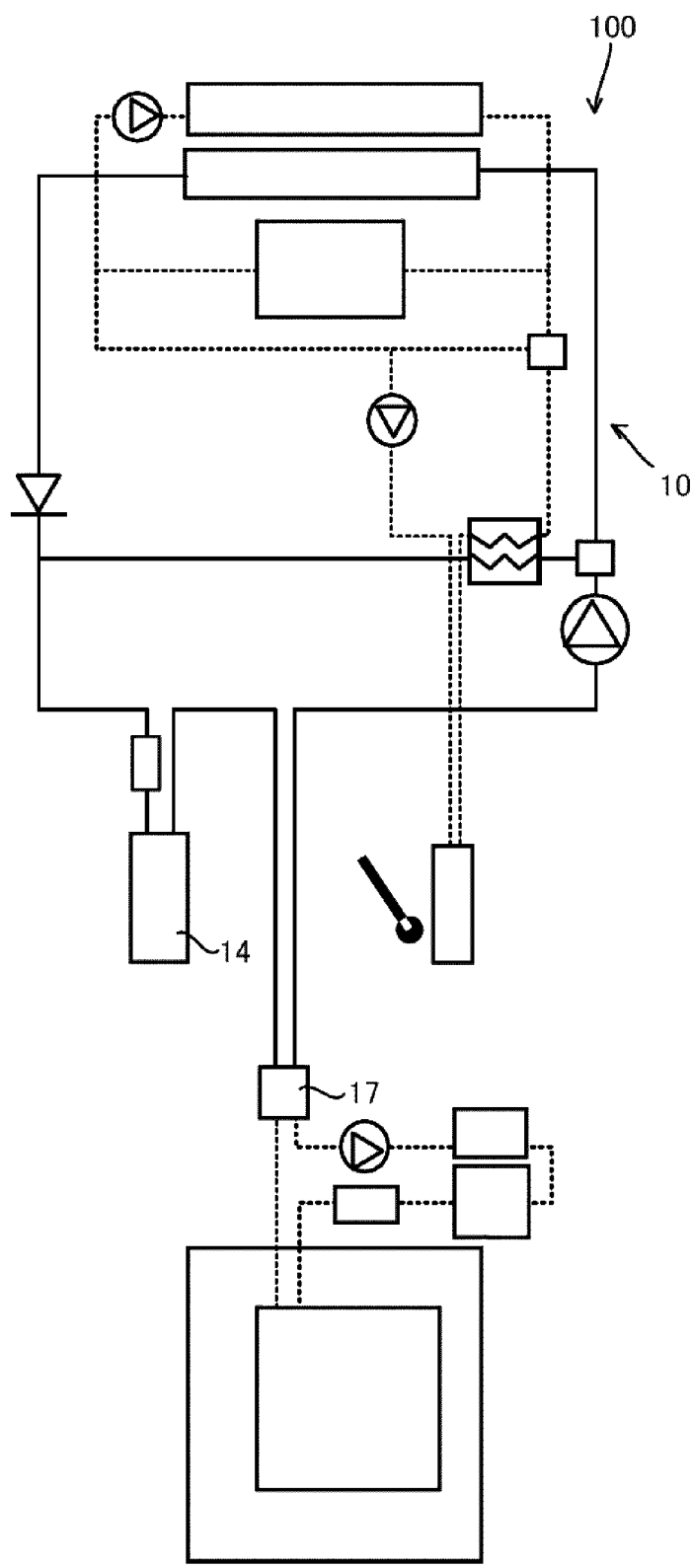
FIG. 14 illustrates the entire constitution of the thermal management system for the electric vehicle according yet another embodiment.

FIG. 14 illustrates a third modification example of the thermal management system for the electric vehicle 100.

According to the third modification example, the structure of the air conditioner loop 10 is different from that of the above-described embodiment. According to the above-described embodiment, the evaporator 14 and the chiller 17 in the air conditioner loop 10 are connected in parallel. However, according to this modification example, the evaporator 14 and the chiller 17 are connected in series in this order.

According to this modification example, the passage 19 and the solenoid valves 22 and 23 in the air conditioner loop 10 can be omitted, and hence its structure can be simplified.

Figure 15:
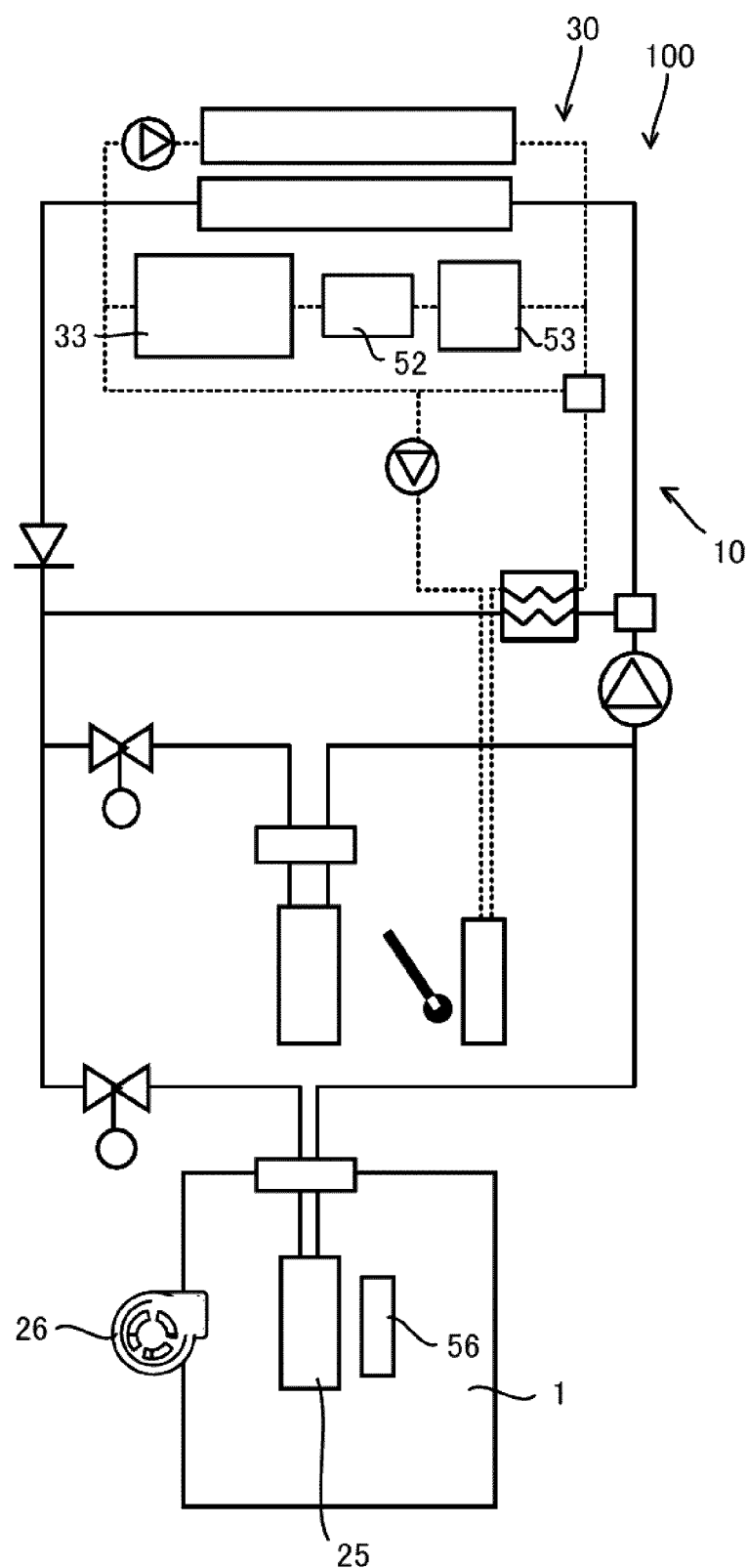
FIG. 15 illustrates the entire constitution of the thermal management system for the electric vehicle according another embodiment.

FIG. 15 illustrates a fourth modification example of the thermal management system for the electric vehicle 100.

According to the fourth modification example, the structure of the high water temperature loop 30 and the air conditioner loop 10 is different from that of the above-described embodiment. In addition, air is used, instead of the cooling water, as the refrigerant in the low water temperature loop 50. Namely, a fan 26 is used to cool the battery 1 by air.

An air heater 56 is used to heat the battery. In the high water temperature loop 30, the DC/DC converter 52 and the inverter 53 are arranged in series to the motor 33 of the above-described embodiment. In the air conditioner loop 10, an evaporator 25 is provided instead of the chiller 17 of the above-described embodiment, and this evaporator 25 is arranged next to the battery 1.

According to this modification example, the temperature of the battery 1 can be adjusted appropriately by adjusting operation status of the evaporator 25 and the hot water heater 54. In addition, a cooling system of the battery 1 can be simplified as the cooling water in the low water temperature loop 50 is omitted.

Figure 16:
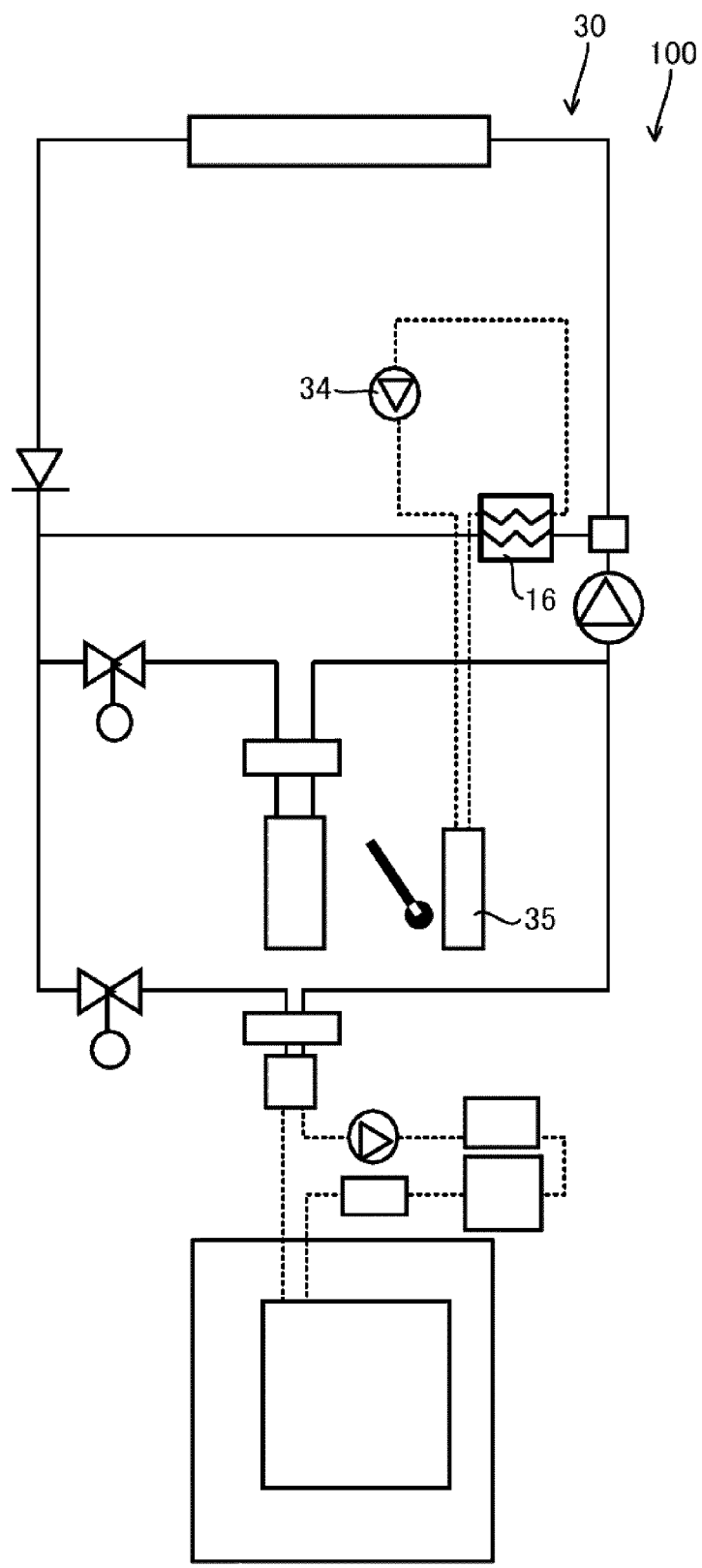
FIG. 16 illustrates the entire constitution of the thermal management system for the electric vehicle according still another embodiment.

FIG. 16 illustrates a fifth modification example of the thermal management system for the electric vehicle 100.

The fifth modification example assumes that the vehicle employs an in-wheel motor, housed inside a driving wheel, as the motor for driving the vehicle. According to this modification example, the structure of the high water temperature loop 30 is different from that of the above-described embodiment.

With regard to the high water temperature loop 30, the motor 33, the radiator pump 31, the radiator 32, and the water switching valve 37 are removed from the high water temperature loop 30 of the above-described embodiment, so as to obtain a circuit in which the cooling water, sent from the H/C pump 34, circulates through the heater core 35 and the water condenser 16.

According to this modification example, it is possible to realize the thermal management system 100 that is similar to the above-described embodiment, even in the vehicle on which the in-wheel motor is mounted.

Figure 17:
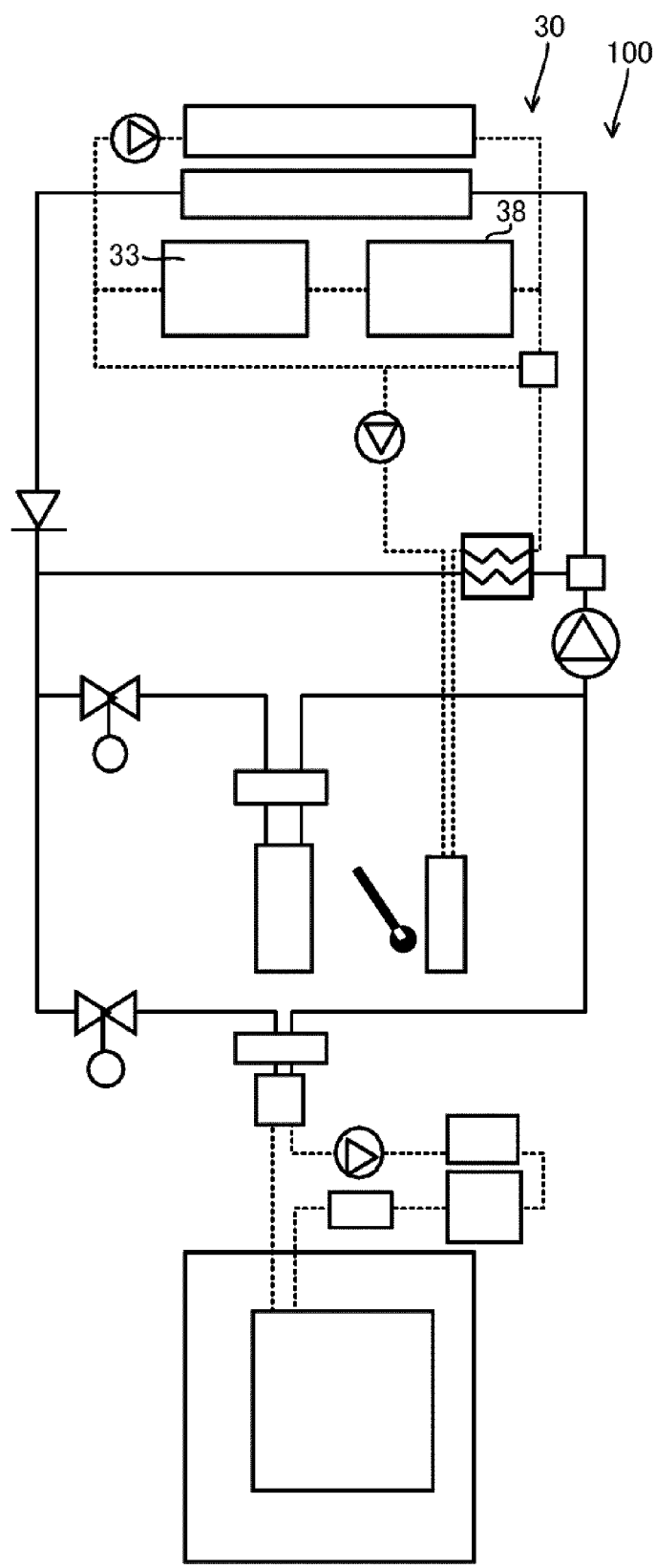
FIG. 17 illustrates the entire constitution of the thermal management system for the electric vehicle according yet another embodiment.

FIG. 17 illustrates a sixth modification example of the thermal management system for the electric vehicle 100.

The sixth modification example assumes that the vehicle is provided with both of the motor 33 and an engine 38, such as a hybrid vehicle and a range extender EV vehicle. According to this modification example, the structure of the high water temperature loop 30 is different from that of the above-described embodiment. In the high water temperature loop 30, the engine 38 is arranged in series to the motor 33 of the above-described embodiment.

According to this modification example, it is possible to realize the thermal management system 100 that is similar to the above-described embodiment, by effectively using the waste heat of the engine 38, even in the vehicle on which the engine 38 is mounted.

The embodiments of the present invention have been explained thus far. However, the above-described embodiments are only a part of application examples of the present invention, and are not intended to limit the technical scope of the present invention to the concrete configuration of the above-described embodiments.

For example, the threshold value, used for determining the operation of the hot water heater 54, is set at 70% according to the above-described embodiment. However, the threshold value may be set at the value that is different from 70%, in consideration of the relationship between the state of charge and the charging heat to be generated.

Further, the target temperature of the low water temperature loop 50 is set at 35° C. for the heating mode and at 15° C. for the cooling mode. However, it may be set at the different temperature within the temperature range that is suitable for the operation of the battery 1 provided in the low water temperature loop 50.

Furthermore, the target temperature of the high water temperature loop 30 is set at 80° C. for the heating mode and at 60° C. for the cooling mode. However, it may be set at the different temperature within the temperature range that is suitable for the operation of the motor 33 provided in the high water temperature loop 30.

Further, the target temperatures of the low water temperature loop 50 and the high water temperature loop 30 may be different between the case when the water temperature is increasing and the case when the water temperature is decreasing, by providing differential (hysteresis) to prevent chattering.

Furthermore, the antifreeze has been used as an example to explain the cooling water of the low water temperature loop 50 and the high water temperature loop 30, but other refrigerants, such as oil, may be employed.

The present application claims priority to Japanese Patent Application No. 2012-179334, filed in the Japan Patent Office on Aug. 13, 2012. The contents of this application are incorporated herein by reference in their entirety.

The invention claimed is:

1. A thermal management system for an electric vehicle that is used in the electric vehicle driven by an electric motor, comprising:
   a refrigerant loop for an air conditioner that includes a compressing unit for compressing a refrigerant for the air conditioner, a condensing unit for condensing the refrigerant for the air conditioner by radiating heat of the refrigerant for the air conditioner, a pressure reducing unit for expanding and reducing pressure of the refrigerant for the air conditioner, and an evaporating unit for evaporating the refrigerant for the air conditioner by allowing the refrigerant for the air conditioner to absorb heat, and that allows the refrigerant for the air conditioner to circulate;
   a refrigerant loop for a battery that allows a refrigerant for the battery to circulate among the battery that accumulates power to be supplied to the electric motor, the evaporating unit that is common to the refrigerant loop for the air conditioner, and a heating device that heats the refrigerant for the battery;
   a thermal management controlling unit adapted to allow the refrigerant for the battery to circulate during charging, during when the battery is in a state of accumulating power supplied from an external power supply, heat the refrigerant for the battery by using the heating device when temperature of the refrigerant for the battery is lower than target temperature of the refrigerant for the battery, and allow the refrigerant for the air conditioner to circulate and to absorb heat from the refrigerant for the battery, in the evaporating unit, when the temperature of the refrigerant for the battery is higher than the target temperature of the refrigerant for the battery,
   a refrigerant loop for a heater that allows a refrigerant for the heater to circulate through the condensing unit that is common to the refrigerant loop for the air conditioner; and
   a circulating unit of the refrigerant for the heater adapted to allow the refrigerant for the heater to circulate during charging of the battery,
   wherein the refrigerant loop for the heater includes an out-of-vehicle radiating device that radiates heat from the refrigerant for the heater to air outside the vehicle, and
   wherein, when temperature of the refrigerant for the heater is higher than upper-limit temperature during heating, the thermal management controlling unit allows heat to be radiated, in the out-of-vehicle radiating device, from the refrigerant for the heater, during charging of the battery.

2. The thermal management system for the electric vehicle according to claim 1,
   wherein, when target blowout temperature of an air conditioning unit that adjusts temperature of air inside a cabin is higher than the temperature of the air inside the cabin, the target temperature of the refrigerant for the battery is set at allowable upper-limit temperature of the battery, and when the target blowout temperature of the air conditioning unit is lower than the temperature of the air inside the cabin, the target temperature of the refrigerant for the battery is set at allowable lower-limit temperature of the battery.

3. The thermal management system for the electric vehicle according to claim 1,
   wherein the refrigerant loop for the heater includes an in-vehicle radiating device that radiates heat from the refrigerant for the heater to air introduced into the vehicle, and
   wherein, when target blowout temperature of an air conditioning unit is higher than temperature of air inside a cabin, and when temperature of the refrigerant for the heater is higher than lower-limit temperature during heating, the thermal management controlling unit allows heat to be radiated, in the in-vehicle radiating device, from the refrigerant for the heater, during charging of the battery.

4. The thermal management system for the electric vehicle according to claim 1,
   wherein, when the battery is being charged and when target blowout temperature of an air conditioning unit is lower than temperature of air inside a cabin, the thermal management controlling unit allows heat to be radiated, in the out-of-vehicle radiating device, from the refrigerant for the heater, irrespective of the temperature of the refrigerant for the heater, when the refrigerant for the air conditioner is allowed to circulate.

5. The thermal management system for the electric vehicle according to claim 1,
   wherein the heating device comprises the heater, the heater being an electric heater operated by power supplied from the battery.

6. The thermal management system for the electric vehicle according to claim 1,
   wherein the evaporating unit is formed by a first evaporating device, in which the refrigerant for the air conditioner absorbs heat from air introduced into the vehicle, and a second evaporating device provided along the refrigerant loop for the air conditioner in parallel with the first evaporating device, in which the refrigerant for the air conditioner absorbs heat from the refrigerant for the battery, and
   wherein a switching unit adapted to allow the refrigerant for the air conditioner to circulate to at least one of a side of the first evaporating device or a side of the second evaporating device is provided.

7. The thermal management system for the electric vehicle according to claim 1,
   wherein the evaporating unit is formed by a first evaporating device, in which the refrigerant for the air conditioner absorbs heat from air introduced inside the vehicle, and a second evaporating device provided along the refrigerant loop for the air conditioner in series with the first evaporating device, in which the refrigerant for the air conditioner absorbs heat from the refrigerant for the battery.

8. The thermal management system for the electric vehicle according to claim 1,
wherein air is used as the refrigerant for the battery in the refrigerant loop for the battery.

9. A control method of a thermal management system for an electric vehicle that is used in the electric vehicle driven by an electric motor,
wherein the thermal management system for the electric vehicle comprises
a refrigerant loop for an air conditioner that includes a compressing unit for compressing a refrigerant for the air conditioner, a condensing unit for condensing the refrigerant for the air conditioner by radiating heat of the refrigerant for the air conditioner, a pressure reducing unit for expanding and reducing pressure of the refrigerant for the air conditioner, and an evaporating unit for evaporating the refrigerant for the air conditioner by allowing the refrigerant for the air conditioner to absorb heat, and that allows the refrigerant for the air conditioner to circulate,
a refrigerant loop for a battery that allows a refrigerant for the battery to circulate among the battery that accumulates power to be supplied to the electric motor, the evaporating unit that is common to the refrigerant loop for the air conditioner, and a heating device that heats the refrigerant for the battery,
a refrigerant loop for a heater that allows a refrigerant for the heater to circulate through the condensing unit that is common to the refrigerant loop for the air conditioner; and
a circulating unit of the refrigerant for the heater adapted to allow the refrigerant for the heater to circulate during charging of the battery,
wherein the control method comprises:
allowing the refrigerant for the battery to circulate during charging, during when the battery is in a state of accumulating power supplied from an external power supply;
heating the refrigerant for the battery by using the heating device when temperature of the refrigerant for the battery is lower than target temperature of the refrigerant for the battery; and
allowing the refrigerant for the air conditioner to circulate and to absorb heat from the refrigerant for the battery, in the evaporating unit, when the temperature of the refrigerant for the battery is higher than the target temperature of the refrigerant for the battery,
wherein the refrigerant loop for the heater includes an out-of-vehicle radiating device that radiates heat from the refrigerant for the heater to air outside the vehicle, and
wherein the control method further comprises, when temperature of the refrigerant for the heater is higher than upper-limit temperature during heating, allowing heat to be radiated, in the out-of-vehicle radiating device, from the refrigerant for the heater, during charging of the battery.

* * * * *